(12) United States Patent
Khoryaev et al.

(10) Patent No.: US 11,405,945 B2
(45) Date of Patent: *Aug. 2, 2022

(54) SIDELINK CONTROL INFORMATION FOR VEHICLE-TO-VEHICLE COMMUNICATIONS

(71) Applicant: Intel Corporation, Santa Clara, CA (US)

(72) Inventors: Alexey Khoryaev, Nizhny Novgorod (RU); Kilian Roth, München BY (DE); Leonardo Gomes Baltar, München BY (DE); Sergey Sosnin, Zavolzhie NIZ (RU)

(73) Assignee: Intel Corporation, Santa Clara, CA (US)

( * ) Notice: Subject to any disclaimer, the term of this patent is extended or adjusted under 35 U.S.C. 154(b) by 76 days.

This patent is subject to a terminal disclaimer.

(21) Appl. No.: 16/408,292

(22) Filed: May 9, 2019

(65) Prior Publication Data

US 2019/0373625 A1    Dec. 5, 2019

Related U.S. Application Data

(63) Continuation of application No. 16/277,709, filed on Feb. 15, 2019, now Pat. No. 11,291,030.
(Continued)

(51) Int. Cl.
*H04W 72/12* (2009.01)
*H04L 1/00* (2006.01)
(Continued)

(52) U.S. Cl.
CPC ....... *H04W 72/1278* (2013.01); *H04L 1/0003* (2013.01); *H04L 1/0013* (2013.01);
(Continued)

(58) Field of Classification Search
CPC . H04L 12/14; H04L 12/1432; H04L 12/1446; H04L 12/4641; H04L 41/046; H04L 41/5006; H04L 41/5096; H04L 43/08; H04L 43/10; H04L 45/02; H04L 45/04; H04L 45/586; H04L 45/64;
(Continued)

(56) References Cited

U.S. PATENT DOCUMENTS

2017/0188391 A1    6/2017 Rajagopal et al.
2018/0279305 A1*   9/2018 Bagheri ............. H04W 72/044
(Continued)

FOREIGN PATENT DOCUMENTS

WO    2017135998 A1    8/2017

OTHER PUBLICATIONS

3GPP, "Technical Specification Group Radio Access Network; Evolved Universal Terrestrial Radio Access (E-UTRA); Radio Resource Control (RRC); Protocol specification (Release 15)," 3GPP TS 36.331 V15.0.1 (Jan. 2018), Lte Advanced Pro, 762 pages.
(Continued)

*Primary Examiner* — Khaled M Kassim
*Assistant Examiner* — Kai Chang
(74) *Attorney, Agent, or Firm* — Schwabe, Williamson & Wyatt, P.C.

(57) ABSTRACT

Embodiments of the present disclosure describe methods and apparatuses for sidelink control information for vehicle-to-vehicle communications.

20 Claims, 11 Drawing Sheets

Providing a message that includes SCI to schedule a physical sidelink shared channel (PSSCH), the SCI to include a bit to indicate rate-matching and transport block size (TBS)-scaling information of the PSSCH
402

Controlling transmission of the message.
404

Related U.S. Application Data

(60) Provisional application No. 62/710,322, filed on Feb. 16, 2018.

(51) Int. Cl.
| | | |
|---|---|---|
| *H04W 76/14* | (2018.01) | |
| *H04W 72/04* | (2009.01) | |
| *H04W 4/46* | (2018.01) | |
| *H04W 52/16* | (2009.01) | |
| *H04W 52/32* | (2009.01) | |
| *H04W 52/26* | (2009.01) | |
| *H04W 52/42* | (2009.01) | |
| *H04W 4/70* | (2018.01) | |
| *H04W 4/06* | (2009.01) | |
| *H04W 4/10* | (2009.01) | |

(52) U.S. Cl.
CPC ............ *H04W 4/46* (2018.02); *H04W 52/16* (2013.01); *H04W 52/26* (2013.01); *H04W 52/325* (2013.01); *H04W 52/42* (2013.01); *H04W 72/0406* (2013.01); *H04W 72/1205* (2013.01); *H04W 76/14* (2018.02); *H04W 4/06* (2013.01); *H04W 4/10* (2013.01); *H04W 4/70* (2018.02)

(58) Field of Classification Search
CPC ... H04L 49/70; H04L 2212/00; H04L 1/0003; H04L 1/0009; H04L 1/0013; H04L 1/0606; H04L 5/0046; H04L 5/0091; H04M 15/00; H04M 15/51; H04W 4/06; H04W 4/10; H04W 4/46; H04W 4/70; H04W 52/16; H04W 52/325; H04W 52/42; H04W 72/0406; H04W 72/1205; H04W 72/1278; H04W 76/14
See application file for complete search history.

(56) References Cited

U.S. PATENT DOCUMENTS

| | | | |
|---|---|---|---|
| 2018/0323935 A1 | 11/2018 | Yerramalli et al. | |
| 2018/0376474 A1 | 12/2018 | Khoryaev et al. | |
| 2019/0053203 A1* | 2/2019 | Xu | H04W 72/042 |
| 2019/0090107 A1 | 3/2019 | Kim et al. | |
| 2019/0090250 A1* | 3/2019 | Lee | H04W 72/0446 |
| 2019/0124015 A1 | 4/2019 | Loehr et al. | |
| 2019/0174530 A1* | 6/2019 | Kim | H04L 1/0025 |
| 2019/0199477 A1* | 6/2019 | Park | H04L 1/0693 |
| 2019/0200330 A1* | 6/2019 | Wikstrom | H04L 1/0007 |
| 2019/0356451 A1* | 11/2019 | Zhang | H04L 5/0053 |
| 2019/0364585 A1* | 11/2019 | Lee | H04W 72/12 |
| 2020/0067610 A1 | 2/2020 | Lee et al. | |
| 2020/0236666 A1* | 7/2020 | Yu | H04W 72/0446 |
| 2020/0252909 A1* | 8/2020 | Yu | H04W 72/042 |
| 2020/0374859 A1 | 11/2020 | Han et al. | |
| 2021/0051627 A1* | 2/2021 | Lee | H04L 5/0044 |

OTHER PUBLICATIONS

Intel Corporation, "Support of 64QAM for LTE V2V sidelink communication," 3GPP TSG RAN WG1 Meeting #91, R1-1720033, Agenda item: 6.2.3.2, Nov. 27-Dec. 1, 2017, Reno, USA, 8 pages.

3GPP, "Technical Specification Group Radio Access Network; Evolved Universal Terrestrial Radio Access (E-UTRA); Multiplexing and channel coding (Release 15)," 3GPP TS 36.212 V15.0.1 (Jan. 2018), 5G, 214 pages.

3GPP, "Technical Specification Group Radio Access Network; Evolved Universal Terrestrial Radio Access (E-UTRA); Physical layer procedures (Release 15)," 3GPP TS 36.213 V15.0.0 (Dec. 2017), 5G, 493 pages.

United States Patent Office—Office Action dated Jul. 7, 2020 from U.S. Appl. No. 16/277,709, 23 pages.

United States Patent Office—Office Action dated May 21, 2021 from U.S. Appl. No. 16/277,709, 28 pages.

\* cited by examiner

SIDELINK CONTROL INFORMATION FOR VEHICLE-TO-VEHICLE COMMUNICATIONS

CROSS REFERENCE TO RELATED APPLICATIONS

This application is a continuation of U.S. patent application Ser. No. 16/277,709 filed on Feb. 15, 2019, entitled "SIDELINK CONTROL INFORMATION FOR VEHICLE-TO-VEHICLE COMMUNICATIONS," which claims priority under 35 U.S.C. § 119(e) to U.S. Provisional Patent Application No. 62/710,322 entitled "CONTROL INFORMATION FOR VEHICLE-TO-VEHICLE (V2V) IN SIDELINK CONTROL INFORMATION (SCI) FORMAT," filed Feb. 16, 2018, the disclosures of which are incorporated herein by their entireties.

FIELD

Embodiments of the present disclosure generally relate to the field of networks, and more particularly, to apparatuses, systems, and methods for sidelink (SL) control information (SCI) for V2V communications.

BACKGROUND

Cellular V2V technology based on a SL was introduced in the $3^{rd}$ Generation Partnership (3GPP) Long Term Evolution (LTE) Release (Rel.) 14. Enhancements to LTE V2V Rel. 14 SL technology are included in later releases of the specification, such as, for example, the specification of LTE V2V Rel. 15. Control information formats in later releases may be expected to be decodable by user equipment (UE) that operates based on earlier technology, such as, for example, but not limited to, Rel. 14 technology, as well as UE that operates based on later technology, such as, for example, but not limited to, Rel. 15 technology, so that both types of UEs are able to decode control channel transmissions.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
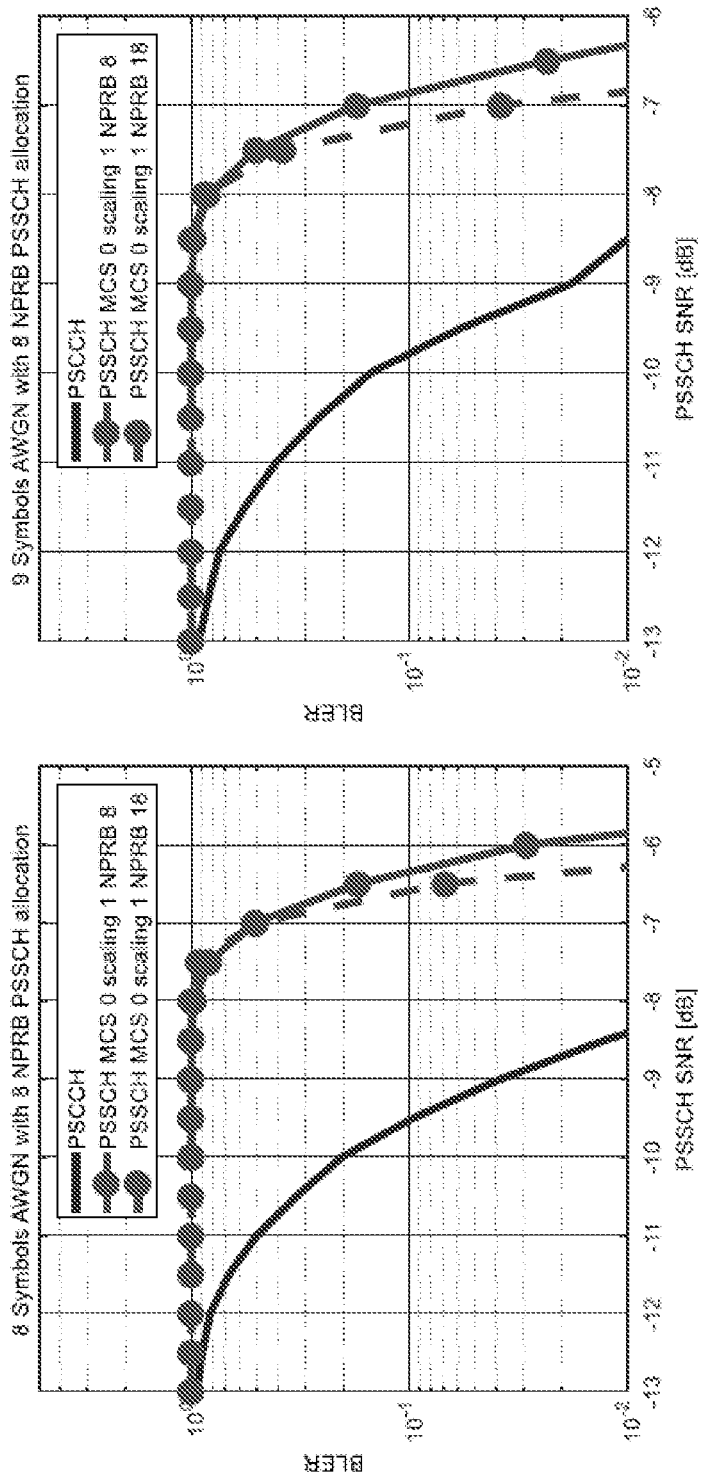
FIG. 1 illustrates exemplary physical sidelink control channel (PSCCH) and physical sidelink shared channel (PSSCH) MCS 0 performance in an AWGN channel with PSCCH power boosting, according to some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc., in order to provide a thorough understanding of the various aspects of the claimed embodiments. However, it will be apparent to those skilled in the art having the benefit of the present disclosure that the various aspects of the embodiments claimed may be practiced in other examples that depart from these specific details. In certain instances, descriptions of well-known devices, circuits, and methods are omitted so as not to obscure the description of embodiments of the present disclosure with unnecessary detail.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in various embodiments," "in some embodiments," and the like are used repeatedly. The phrase generally does not refer to the same embodiments; however, it may. The terms "comprising," "having," and "including" are synonymous, unless the context dictates otherwise. The phrase "A or B" means (A), (B), or (A and B).

The term "coupled with," along with its derivatives, may be used herein. "Coupled" may mean one or more of the following. "Coupled" may mean that two or more elements are in direct physical or electrical or communicative contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or elements are in direct contact.

The term "based on," and the like, along with its derivatives, may be used herein. "Based on" may mean that one element is based entirely on another element, or "based on" may mean that one element is based at least in part on another element and thus may be based at least in part on other elements.

Example embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional operations not included in the figure(s). A process may correspond to a method, a function, a procedure, a subroutine, a subprogram, and the like. When a process corresponds to a function, its termination may correspond to a return of the function to the calling function and/or the main function.

As used herein, the term "processor circuitry" refers to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. As used herein, the term "interface circuitry" refers to, is part of, or includes circuitry providing for the exchange of information between two or more components or devices. The term "interface circuitry" may refer to one or more hardware interfaces (for example, buses, input/output (I/O) interfaces, peripheral component interfaces, and the like).

As used herein, the term "user equipment" or "UE" may be considered synonymous to, and may hereafter be occasionally referred to, as a client, mobile, mobile device, mobile terminal, user terminal, mobile unit, mobile station, mobile user, subscriber, user, remote station, access agent, user agent, receiver, etc., and may describe a remote user of network resources in a communications network. Furthermore, the term "user equipment" or "UE" may include any type of wireless/wired device such as consumer electronics devices, cellular phones, smartphones, tablet personal computers, Internet of Things ("IoT") devices, smart sensors, wearable computing devices, personal digital assistants (PDAs), desktop computers, and laptop computers, for example.

As used herein, the term "base station" may be considered synonymous to, and may hereafter be occasionally referred to, as access nodes (ANs), NodeBs, evolved NodeBs (eNBs), next Generation NodeBs (gNB), radio access node (RAN) nodes, and so forth, and may comprise ground stations (e.g., terrestrial access points) or satellite stations providing coverage within a geographic area (e.g., a cell). A base station may be a device that is consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3rd Generation Partnership Project ("3GPP") Long Term Evolution (LTE) protocol, a fifth generation (5G) protocol, which may be referred to as New Radio (NR), or a protocol that is consistent with other existing generations, generations in development or to be developed in the future (e.g., second generation (2G), sixth generation (6G), etc.), an NR protocol, and the like.

With regard to V2V communication, a UE as a vehicle may communicate with one or more other vehicles. For example, a vehicle may transmit data to one or more other vehicles. For purposes of illustration and ease of explanation, embodiments herein may be described in terms of a UE that is a vehicle. However, embodiments herein may be applicable to other types of UEs. A vehicle may, for example, periodically or non-periodically broadcast messages such as, for example, but not limited to, a Cooperative Awareness Message (CAM) or a Decentralized Environmental Notification Message (DENM). A CAM may provide status information, such as, for example, but not limited to, speed, direction, position, size of a vehicle, etc. A DENM may provide event-oriented information, such as, for example, but not limited to, whether hard braking was applied and its intensity, whether an accident is ahead, etc.

Further, in V2V communications, control information may be transmitted in association with a data transmission, so that a receiving UE, such as a vehicle, is able to demodulate the received data transmission. In one instance, such as, for example, but not limited to, a so-called mode-3 of V2V communications, a base station may transmit the control information to two vehicles that will communicate with each other, prior to one of the UEs transmitting data to the other. A base station may transmit the control information in a physical downlink control channel (PDCCH) that includes either some or all of the control information necessary for vehicles to communicate. In another instance, such as, for example, but not limited to, a so-called mode-4 of V2V communications, a vehicle may broadcast the control information to one or more other vehicles prior to broadcasting data to one or more other vehicles. A UE may broadcast the control information in a PSCCH that may include either some or all of the control information necessary for vehicles to communicate, and may broadcast the data in a PSSCH. Alternatively, a UE may broadcast data without broadcasting control information or without transmission of control information by a base station.

Although embodiments herein may be described in terms of a vehicle (or other UE) that broadcasts control information or data, embodiments herein may be applicable to a vehicle (or other UE) that communicates other than by broadcasting, as when one vehicle communicates with another vehicle directly. In addition, although embodiments herein may be described in terms of a base station that transmits control information to two vehicles that will exchange data or that will have one vehicle transmit data to the other vehicle, embodiments herein may be applicable to a base station that transmits control information to more than two vehicles, without regard to whether any of the vehicles will be transmitting data to or exchanging data with one or more other vehicles.

Enhancements to V2V technology may include, for example, but are not limited to, support for higher order modulation such as 64-quadrature amplitude modulation (QAM) and transmit diversity schemes. The introduction of the new transmission format supporting new modulation order (64-QAM), transmit diversity scheme (space frequency block coding (SFBC)) and additional demodulation related enhancements, such as new rate matching behavior, as well as a modified modulation and coding scheme (MCS)/transport block size (TBS) table and TBS selection procedure may require a new control information format. For example, SCI Format 1 in LTE V2V Rel. 14 may not cover all possible transmission schemes for LTE V2V Rel. 15 and thus may need to be updated. Accordingly, enhancements may include modification of fields in SCI Format 1 used in LTE V2V Rel. 14 or the definition of a new SCI format (e.g., SCI Format 2). Modified or new control information formats may be expected to be decodable by UEs that operate based on earlier technology, such as, for example, but not limited to, Rel. 14 technology, as well as UEs that operate based on later technology, such as, for example, but not limited to, Rel. 15 technology, so that both types of UEs are able to decode control channel transmissions. For purposes of illustration and ease of explanation, embodiments herein may be described in terms of Rel. 14 and Rel. 15 and their related technologies. However, embodiments herein are not limited to Rel. 14 and Rel. 15, and may be used with to other types of applicable technologies or other applicable 3GPP releases or specifications.

Further, such modified or new control information formats may have the same payload size as earlier formats, such as, for example, SCI Format 1, for SL operation in resource allocation mode-3 and mode-4, for example, and downlink control information (DCI) Format 5 for downlink reception of evolved NodeB (eNB) SL scheduling grant in the case of, for example, mode-3 operation. In that case, LTE-V2V SL control signaling (e.g., SCI Format 1) and downlink control signaling (e.g., DCI Format 5) may support later technology enhancements, such as, for example, but not limited to, LTE V2V Rel. 15 enhancements, in a backward compatible manner with earlier technology, such as, for example, but not limited to, Rel. 14 UEs, so that both types of UEs are able to decode control channel transmission from other UEs or from eNBs, as applicable. Embodiments herein may include control signaling to support later technology enhancements, such as, for example, but not limited to, Rel. 15 enhancements.

Embodiments herein may include control signaling details that may help to support new V2V features for UEs based on later technologies, such as, for example, but not limited to, Rel. 15 UEs, while being decodable by legacy UEs, such as, for example, but not limited to, Rel. 14 UEs, for a PSCCH. Although embodiments herein may be directed to PSCCHs, such embodiments are not limited to applicability to PSCCHs. Aspects of LTE V2V may require, for example, an extension in control signaling. In general, the majority of the control information may be transmitted via the PSCCH. SCI may be used for scheduling information, and for V2V, SCI Format 1 may be used. In the definition of SCI Format 1 in Rel. 14, for example, at most 25 bits out of a total of 32 bits are occupied. The 25-bit size of SCI Format 1 in Rel. 14 may cause an issue with regard to the maximum number of utilized bits. Therefore, depending on other system parameters, the actual number of required bits could be smaller. In Rel. 14, all remaining 7 bits may be used for additional control information. Embodiments herein may include aspects to use the remaining bits to extend SCI Format 1 to accommodate additional information such as, for example, PSCCH power boosting, Rel. 15 MCS table, transmit diversity and/or TBS scaling. All, substantially all, or multiple possibilities for different transmission configurations in LTE V2V Rel. 15 may be accommodated, which may enable UEs with additional capabilities. The following enhancements may be used for LTE Rel. 15 PSCCH or PSSCH. Although embodiments herein may be directed to LTE Rel. 15 PSCCHs, such embodiments are not limited to applicability to such PSCCHs, and may be directed to later applicable releases or to later applicable channels.

Enhancements may include new rate-matching behavior, which may be referred to as enhanced rate-matching for Rel. 15 PSSCH transmissions, where the last symbol of the SL subframe is rate-matched instead of punctured as done, for example, in Rel. 14 UEs. This enhancement may be referred to as Feature (A). Relative to Rel. 14, the rate matching has changed for Rel. 15 LTE vehicle-to-everything (V2X), for example. In Rel. 14, for the rate matching, the last OFDM symbol was taken into account, but since the last symbol is reserved as a guard period in Rel. 14, LTE V2V, it is not transmitted. Since this is essentially an additional puncturing of the code, this had the effect that there were multiple MCS-Physical Resource Block Number (NPRB) combinations that could not be decoded. Therefore, in Rel. 15, the rate matching was changed to not take the last symbol into account. This improved the situation of the undecodable MCS. Since this may be different from the behavior of Rel. 14 V2V, this may need to be signaled, but may be included in the general signaling of a Rel. 15 transmission.

Enhancements may further include support of 64-QAM and a new MCS table, which may be referred to as a modified MCS table, for PSSCH transmission with an update of MCS indexes and modulation switching points. This enhancement may be referred to as Feature (B). A modified MCS table may be defined to improve or simplify MCS selection and ensure monotonous behavior in terms of transmit spectrum efficiency. A modified MCS table may need to be signaled and may be predefined by, for example, a specification, such as, for example, a 3GPP specification. As in other embodiments, this may be a table that maps from signaling bits to used MCS tables.

The following table, Table 1, shows a possible signaling considering two different MCS tables—Table 2 and Table 3 shown below.

TABLE 1

| Signaled Bits | MCS Table |
| --- | --- |
| 0 | Table 2 |
| 1 | Table 3 |

TABLE 2

| MCS Index $I_{MCS}$ | Modulation Order $Q'_m$ | TBS Index $I_{TBS}$ |
| --- | --- | --- |
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 4 | 8 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 6 | 14 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |

TABLE 2-continued

| MCS Index $I_{MCS}$ | Modulation Order $Q'_m$ | TBS Index $I_{TBS}$ |
|---|---|---|
| 27 | 6 | 25 |
| 28 | 6 | 26 |

TABLE 3

| MCS Index $I_{MCS}$ | Modulation Order $Q'_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |

Enhancements may include PSSCH TBS scaling: TBS selection behavior (e.g., TBS scaling) to compensate overhead introduced into a PSSCH due to the increased density of demodulation reference signals (DMRSs) and overhead for automatic gain control (AGC) settling ($1^{st}$ symbol) and transmit/receive (Tx/Rx) switching (last symbol of subframe). This enhancement may be referred to as Feature (C). Given that the MCS table used for Rel. 14 V2V is the one originally designed for Rel. 8 LTE uplink (UL), it does not fully fit the additional overhead associated with additional reference signals, guard period, and AGC adaptation. Therefore, one option to address this issue and address an issue regarding the gap between MCS 0 of PSSCH and PSCCH would be to scale the column of the TBS table. This means scaling the value of NPRB down from the actual allocation. This could be signaled by a single bit to show whether a predefined scaling was applied or not. It is also possible to signal different scaling values defined by a table such as the example shown in Table 4 below, which illustrates scaling values dependent on signaling bits. The specific scaling value may be also configured as a part of SIB or RRC signaling.

TABLE 4

| Signaling Bits Value | Scaling Factor |
|---|---|
| 00 | 1 |
| 01 | 0.9 |

TABLE 4-continued

| Signaling Bits Value | Scaling Factor |
|---|---|
| 10 | 0.8 |
| 11 | 0.7 |

Enhancements may further include a new PSSCH transmission mode (Sidelink Transmission Mode—Single Port or Tx-Diversity, e.g. SFBC), e.g. two-port SFBC transmit diversity scheme versus single port transmission in Rel. 14. This enhancement may be referred to as Feature (D). For Rel. 15, LTE V2V Tx-diversity (SFBC) may be provided. For Tx-diversity, more than one antenna with full control of the digital signal may be necessary, and for this case, up to two transmit streams may be supported. However, many vehicle original equipment manufacturers (OEMs) may not want to support more than one antenna for these systems, but may support it at the receiver. The support at the receiver is also possible with only a single antenna. To enable different companies and OEMs to use the setup they prefer, it may be important to separately signal whether Tx diversity was used for the transmission or not. This also enables companies to compete with regard to the support and implementation of this feature. A single bit may be used to signal this information. If it is set to "1," Tx-diversity is used, and if it is set to "0," Tx-diversity is not used.

Enhancements may further include PSCCH power boosting, with a new value of PSCCH power spectral density (PSD) boosting over PSSCH. This enhancement may be referred to as Feature (E). In Rel. 14, for example, PSD boosting of PSCCH over PSSCH is fixed to 3 dB. The boosting leads to significant imbalance between control and shared channel behavior. A new level of boosting may be introduced to reduce this imbalance between SL channels, e.g., −2 dB, −1 dB, 0 dB, 1 dB, 2 dB, that may depend on the PSSCH MCS index adopted.

FIG. 1 illustrates PSCCH and PSSCH MCS 0 performance in an AWGN channel with PSCCH power boosting, according to some embodiments. In connection with providing an MCS table including a possible scaling or the TBS table entries by scaling the column to be used (related to the NPRBs allocated), an imbalance of the performance of a PSCCH and the smallest MCS 0 of the PSSCH may exist. As shown in FIG. 1, this gap is about 2.5 dB at a BLER of 1%. The PSCCH may be transmitted with a power boost of 3 dB relative to the transmit power of the PSSCH. Since both channels are transmitted in the same OFDM symbols, these two channels share the power, and the additional power use for the PSCCH is essentially wasted. To bridge the gap between the PSCCH and the PSSCH MCS 0, it is possible to reduce this power boost. This would increase the available power for the PSSCH and thus improve its performance.

There are multiple options for the way the power boosting may be signaled. The simplest option would be to signal it with a single bit to indicate whether PSCCH power boosting is active or not. Another option would be to signal different PSCCH power boosting values. An embodiment with two bits used for signaling is shown in Table 5, which illustrates PSCCH power boosting with two signaling bits. The specific PSCCH boosting value over PSSCH channel may be also signaled through V2X system information block (SIB) or radio resource control (RRC).

TABLE 5

| Signaling Bits Value | PSCCH power boosting |
|---|---|
| 00 | 0 dB |
| 01 | 1 dB |
| 10 | 2 dB |
| 11 | 3 dB |

With regard to Rel. 15 SCI signaling content, in general, all of the features described above may be simultaneously applied for all Rel. 15 UE transmissions targeted towards Rel. 15 UEs that may require a single bit of information in SCI. Feature (E) regarding PSCCH boosting over PSSCH may not require additional control signaling since it does not affect Rel. 15/Rel. 14 UE demodulation. Among Features (A)-(D), at least support of a new PSSCH transmission mode (e.g., SFBC or Single Port) may require a dedicated indication field (or joint encoding with other fields) in a new SCI format, given that not all UEs may support SFBC transmission from a transmission or receiver perspective (i.e., support of TxD for a Rel. 15 UE may be optional). From that perspective, new UE capability/signaling is needed to differentiate UEs that support Rel. 15 transmission mode (SFBC) from TX and RX or only RX or only TX perspectives.

Among Features (A), (B), and (C), in general all of them may be represented by one bit signaling, i.e., applied together by Rel. 15 UEs. A separate indication may be needed at least for 64QAM support, which may be an optional feature for UE support as well. If 64QAM is not supported by a Rel. 15 UE, then the MCS indexes corresponding to 64QAM may be used for 16QAM transmission by Rel. 15 UEs but with a higher data rate, similar to the principle of Rel. 14 UE behavior that does not support 64QAM. Further, Feature (A) may be applied by Rel. 15 UEs when a higher layer configures transmission to Rel. 15 UEs independently of UE support of 64QAM and SFBC transmit diversity scheme.

At least the following information may be indicated through SCI. (1) Rel. 14/Rel. 15 differentiation—whether a new rate matching procedure is applied and new MCS table with scaling is used. Whether this signaling is needed may depend on whether mixed Rel. 14/Rel. 15 scenario is involved or Rel. 15 only. For Rel. 15 only, this feature may, for example, be mandated for Rel. 15 UE transmission to a Rel. 15 UE that may be configured by higher layer and thus may not need indication for this scenario. For a mixed Rel. 14/Rel. 15 scenario, this signaling is needed for Rel. 14 reception by a Rel. 15 UE (a Rel. 15 UE needs to know how to differentiate Rel. 14 and Rel. 15 PSSCH encoding formats.) If there is no such signaling, a UE may apply dual decoding, but that may lead to unnecessary receiver decoding complexity. (2) Indication for interpretation of MCS indexes corresponding to 64QAM (64-QAM support by Rel. 15 UEs) is other information that may be indicated through SCI. If 64QAM is not supported by a Rel. 15 UE, two options are possible—either not used or used for a 16QAM transmission. In the case of using the 64QAM MCS for 16QAM transmission, this may be separately signaled, and it is also possible to use the transmission of Rel. 14 LTE V2V if this is necessary. If they cannot be used, no further changes may be needed and no signaling may be necessary. If 64QAM is supported by a Rel. 15 UE, then it may be used for 64QAM transmission. (3) Indication of PSSCH transmission mode (Single Port or Transmit Diversity) is other information that may be indicated through SCI. A Rel. 15 UE may be able to indicate whether single port or transmit diversity scheme is applied.

With regard to SCI Format Signaling (whether a modified SCI Format 1 or new SCI Format), SCI format 1 is used for the scheduling of PSSCH. The following information, as provided in whole or in part in, for example, 3GPP TS 36.212, V 15.0.1 (2018-01), "Evolved Universal Terrestrial Radio Access (E-UTRA); Multiplexing and channel coding," which may be referred to herein as TS 36.212, may be transmitted by means of the SCI Format 1: Priority—3 bits; Resource reservation—4 bits; Frequency resource location—$\lceil \log_2(N_{subchannel}^{SL}(N_{subchannel}^{SL}+1)/2) \rceil$ bits. A maximum number for the number of subchannels (numSubchannel) may be, for example, 20, but in the enumeration, there is a spare entry. Thus, a worst case of 20 subchannels may lead to 8 bits being required for the signaling); Time gap between initial transmission and retransmission—4 bits; Modulation and coding scheme—5 bits; Retransmission index—1 bit; Reserved information bits are added until the size of SCI format 1 is equal to 32 bits. The reserved bits are set to zero.

SCI Format 1 may use 25 bits, and therefore 7 bits may be available for the additional signaling. The following table, Table 6, summarizes possible options for the allocation, where the numbers indicated for the features covered by each option indicate the number of bits to be used for a particular feature.

TABLE 6

| Option-Index | Rel. 15 transmission signaling bits | MCS table selection signaling bits | TBS scaling signaling bits | Tx diversity signaling bits | 64QAM support signaling bit |
|---|---|---|---|---|---|
| Option 1 | 1 | 0 | 0 | 1 | 0 |
| Option 2 | 1 | 0 | 0 | 0 | 0 |
| Option 3 | 1 | 0 | 0 | 0 | 1 |
| Option 4 | 1 | 0 | 1 | 0 | 0 |
| Option 5 | 1 | 0 | 2 | 0 | 0 |
| Option 6 | 1 | 0 | 3 | 0 | 0 |
| Option 7 | 1 | 0 | 4 | 0 | 0 |
| Option 8 | 1 | 0 | 5 | 0 | 0 |
| Option 9 | 1 | 0 | 6 | 0 | 0 |
| Option 10 | 1 | 1 | 0 | 0 | 0 |
| Option 11 | 1 | 2 | 0 | 0 | 0 |
| Option 12 | 1 | 3 | 0 | 0 | 0 |
| Option 13 | 1 | 4 | 0 | 0 | 0 |
| Option 14 | 1 | 5 | 0 | 0 | 0 |
| Option 15 | 1 | 6 | 0 | 0 | 0 |
| Option 16 | 1 | 0 | 1 | 0 | 1 |
| Option 17 | 1 | 0 | 2 | 0 | 1 |
| Option 18 | 1 | 0 | 3 | 0 | 1 |
| Option 19 | 1 | 0 | 4 | 0 | 1 |
| Option 20 | 1 | 0 | 5 | 0 | 1 |
| Option 21 | 1 | 1 | 0 | 0 | 1 |
| Option 22 | 1 | 2 | 0 | 0 | 1 |
| Option 23 | 1 | 3 | 0 | 0 | 1 |
| Option 24 | 1 | 4 | 0 | 0 | 1 |
| Option 25 | 1 | 5 | 0 | 0 | 1 |
| Option 26 | 1 | 0 | 1 | 1 | 0 |
| Option 27 | 1 | 0 | 2 | 1 | 0 |
| Option 28 | 1 | 0 | 3 | 1 | 0 |
| Option 29 | 1 | 0 | 4 | 1 | 0 |
| Option 30 | 1 | 0 | 5 | 1 | 0 |
| Option 31 | 1 | 1 | 0 | 1 | 0 |
| Option 32 | 1 | 2 | 0 | 1 | 0 |
| Option 33 | 1 | 3 | 0 | 1 | 0 |
| Option 34 | 1 | 4 | 0 | 1 | 0 |
| Option 35 | 1 | 5 | 0 | 1 | 0 |
| Option 36 | 1 | 0 | 1 | 1 | 1 |
| Option 37 | 1 | 0 | 2 | 1 | 1 |
| Option 38 | 1 | 0 | 3 | 1 | 1 |
| Option 39 | 1 | 0 | 4 | 1 | 1 |

TABLE 6-continued

| Option-Index | Rel. 15 transmission signaling bits | MCS table selection signaling bits | TBS scaling signaling bits | Tx diversity signaling bits | 64QAM support signaling bit |
|---|---|---|---|---|---|
| Option 40 | 1 | 1 | 0 | 1 | 1 |
| Option 41 | 1 | 2 | 0 | 1 | 1 |
| Option 42 | 1 | 3 | 0 | 1 | 1 |
| Option 43 | 1 | 4 | 0 | 1 | 1 |
| Option 44 | 1 | 1 | 1 | 0 | 0 |
| Option 45 | 1 | 2 | 1 | 0 | 0 |
| Option 46 | 1 | 3 | 1 | 0 | 0 |
| Option 47 | 1 | 4 | 1 | 0 | 0 |
| Option 48 | 1 | 5 | 1 | 0 | 0 |
| Option 49 | 1 | 1 | 2 | 0 | 0 |
| Option 50 | 1 | 2 | 2 | 0 | 0 |
| Option 51 | 1 | 3 | 2 | 0 | 0 |
| Option 52 | 1 | 4 | 2 | 0 | 0 |
| Option 53 | 1 | 1 | 3 | 0 | 0 |
| Option 54 | 1 | 2 | 3 | 0 | 0 |
| Option 55 | 1 | 3 | 3 | 0 | 0 |
| Option 56 | 1 | 1 | 4 | 0 | 0 |
| Option 57 | 1 | 2 | 4 | 0 | 0 |
| Option 58 | 1 | 1 | 5 | 0 | 0 |
| Option 59 | 1 | 1 | 1 | 0 | 1 |
| Option 60 | 1 | 2 | 1 | 0 | 1 |
| Option 61 | 1 | 3 | 1 | 0 | 1 |
| Option 62 | 1 | 4 | 1 | 0 | 1 |
| Option 63 | 1 | 1 | 2 | 0 | 1 |
| Option 64 | 1 | 2 | 2 | 0 | 1 |
| Option 65 | 1 | 3 | 2 | 0 | 1 |
| Option 66 | 1 | 1 | 3 | 0 | 1 |
| Option 67 | 1 | 2 | 3 | 0 | 1 |
| Option 68 | 1 | 1 | 4 | 0 | 1 |
| Option 69 | 1 | 1 | 1 | 1 | 0 |
| Option 70 | 1 | 2 | 1 | 1 | 0 |
| Option 71 | 1 | 3 | 1 | 1 | 0 |
| Option 72 | 1 | 4 | 1 | 1 | 0 |
| Option 73 | 1 | 1 | 2 | 1 | 0 |
| Option 74 | 1 | 2 | 2 | 1 | 0 |
| Option 75 | 1 | 3 | 2 | 1 | 0 |
| Option 76 | 1 | 1 | 3 | 1 | 0 |
| Option 77 | 1 | 2 | 3 | 1 | 0 |
| Option 78 | 1 | 1 | 4 | 1 | 0 |
| Option 79 | 1 | 1 | 1 | 1 | 1 |
| Option 80 | 1 | 2 | 1 | 1 | 1 |
| Option 81 | 1 | 3 | 1 | 1 | 1 |
| Option 82 | 1 | 1 | 2 | 1 | 1 |
| Option 83 | 1 | 2 | 2 | 1 | 1 |
| Option 84 | 1 | 1 | 3 | 1 | 1 |

In addition, it is possible that the RRC is signaling different configurations for different resource pools to differentiate Rel. 14 and Rel. 15 vehicles. In this case, either the additional information may be included in SCI Format 1 in the same way as described above, or it may be derived from the context of the RRC signaling and the resource pool used.

Another embodiment may include DCI Format Signaling, which may be, for example, a modified DCI Format 5A or a new DCI format, for example, a DCI Format 5B. Since there might be users with different capability present inside the coverage area around a vehicle, a base station may need to signal the transmission modes that may be used by each vehicle. A first option is to signal this via RRC. Another option is to signal this via RRC and dependent on different resource pools allocated to the different capabilities. In this context, a vehicle may derive which transmission mode to use. If signaling needs to be faster than via RRC, it may be included in a new DCI format possibly to be called DCI Format 5B. In addition to the information included in DCI Format 5A, this Format 5B may include the information to restrict the transmission options the vehicle is able to select.

The following information, as provided in whole or in part in, for example, 3GPP TS 36.212, may be transmitted by means of the DCI Format 5A: Carrier indicator—3 bits; Lowest index of the subchannel allocation—$\lceil \log_2 (N_{subchannel}^{SL}) \rceil$ bits (Maximum 5 bits for maximum number of 20 subchannels); SCI format 1 fields (see above with regard to SCI Format 1); Frequency resource location— Time gap between initial transmission and retransmission. The additional information included in Format 5B may be all or a subset of the following signaling bits: Rel. 15. transmission selectable; Tx diversity selectable; and 64 QAM selectable. These may be dependent on which features are selected as optional and mandatory for, for example, Rel. 15 LTE V2V communications.

Figure 2:
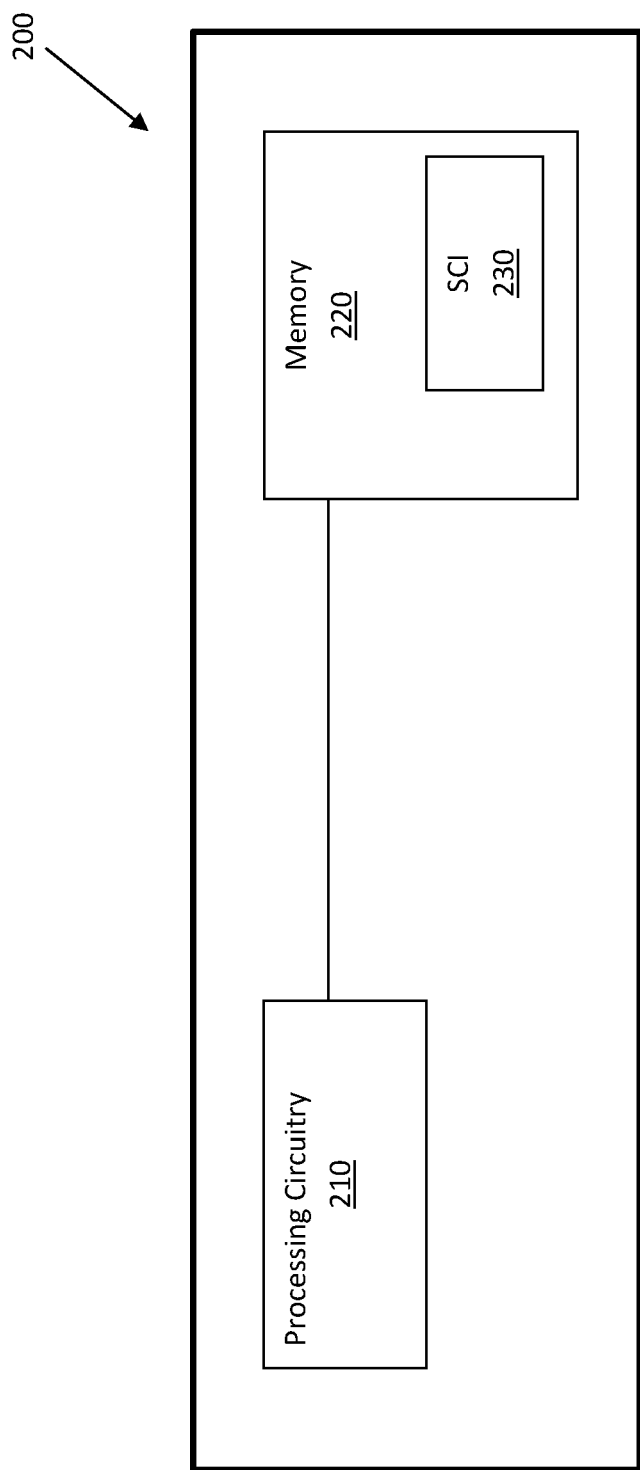
FIG. 2 illustrates an example apparatus for a UE according to some embodiments.

FIG. 2 illustrates an apparatus 200 that may be implemented as, or in, a UE according to some embodiments. The UE may be, for example, a vehicle described above that communicates with one or more other vehicles, although embodiments herein are not limited to a UE that is a vehicle. Apparatus 200 may include processing circuitry 210. Processing circuitry 210 may provide a message that includes SCI 230 to schedule PSSCH, where the SCI 230 is to include a bit to indicate rate-matching and transport block size (TBS)-scaling information of the PSSCH, and control transmission of the message. Apparatus 200 may further include a memory 220, coupled with the processing circuitry 210, to store the SCI 230. Although embodiments herein may be described in terms of a bit to indicate rate-matching and transport block size (TBS)-scaling information of the PSSCH or any other information, embodiments herein may include more than one bit to indicate rate-matching and transport block size (TBS)-scaling information of the PSSCH or any other information.

In an embodiment, the SCI 230 is in SCI Format 1. In an embodiment, a value of 1 for the bit is to indicate that the PSSCH is to be transmitted with a transmission format that is to include rate-matching and TBS scaling. In an embodiment, a value of 0 for the bit is to indicate that the PSSCH is to be transmitted with a transmission format that is to include puncturing and no TBS scaling. In an embodiment, apparatus 200 is further to cause transmission of the PSSCH.

In an embodiment, the SCI 230 further includes a bit to indicate MCS table selection information. In another embodiment, the SCI 230 may include a bit to indicate transmit diversity information. In yet another embodiment, the SCI 230 may include a bit to indicate PSCCH power boosting information.

In yet another embodiment, the SCI 230 may include one or more bits to indicate information of the PSSCH. In an embodiment, the one or more bits may indicate that the PSSCH is to be transmitted with TBS scaling, and the one or more bits may identify a TBS scaling value. In an embodiment, the one or more bits may indicate PSCCH power boosting information, and the one or more bits may identify a PSCCH power boosting value. In an embodiment, the one or more bits may indicate MCS table selection information, where the MCS table selection information may identify an MCS table selected. In an embodiment, the one or more bits may indicate more than one feature described herein, or may identify more than one value described herein.

Figure 3:
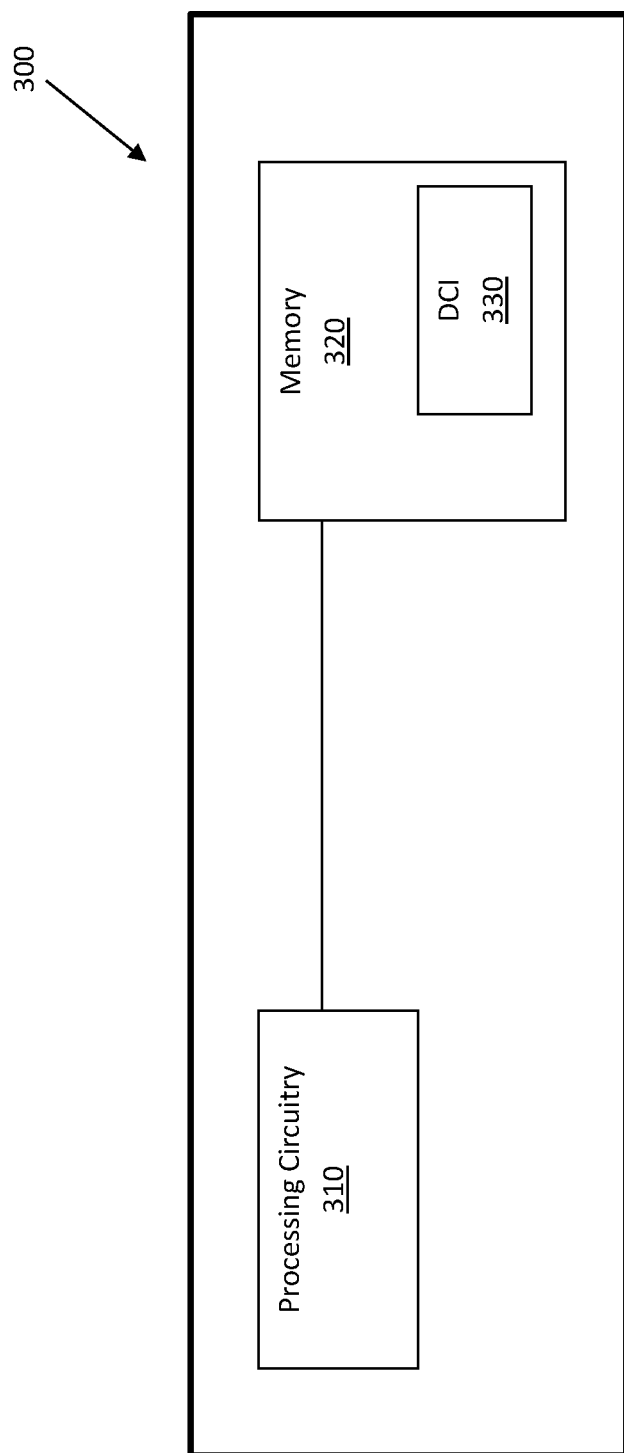
FIG. 3 illustrates an example apparatus for a base station according to some embodiments.

FIG. 3 illustrates an apparatus 300 that may be implemented as, or in, a base station according to some embodiments. Apparatus 300 may include processing circuitry 310. Processing circuitry 310 may provide a message that includes DCI 330 to schedule a PSSCH, where the DCI 330 is to include a bit to indicate information of the PSSCH, and control transmission of the message. Apparatus 300 may further include memory 320, coupled with the processing circuitry 310, to store the DCI 330. In an embodiment, the DCI 330 is in a DCI format 5A. In an embodiment, the bit is to indicate rate-matching information of the PSSCH. In another embodiment, the bit is to indicate modulation and coding scheme (MCS) table selection information of the PSSCH. In yet another embodiment, the bit is to indicate transmit diversity information of the PSSCH. Although embodiments herein may be described in terms of a bit to information of the PSSCH or any other information, embodiments herein may include more than one bit to indicate information of the PSSCH or any other information.

Figure 4:
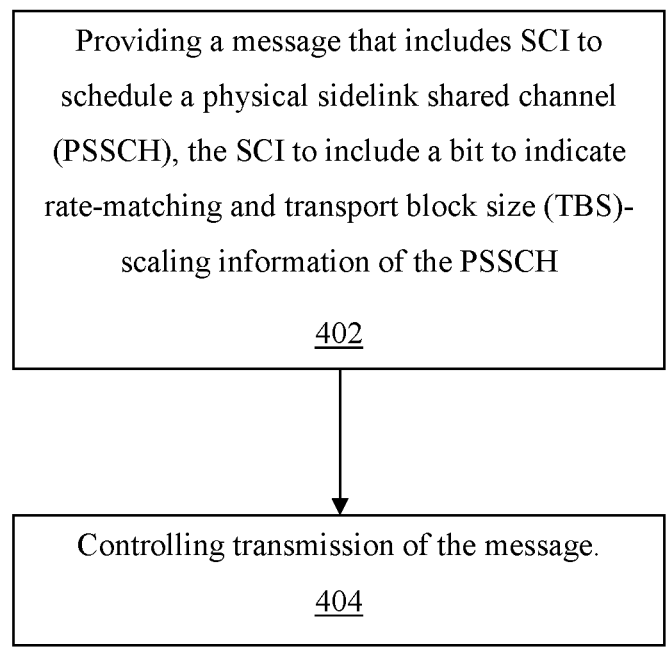
FIG. 4 illustrates an example operation flow/algorithmic structure of a UE according to some embodiments.

FIG. 4 illustrates an example operation flow/algorithmic structure of a UE according to some embodiments. For purposes of illustration and ease of explanation, FIG. 4 is described in terms of a UE. However, embodiments are not limited to applying the operation flow/algorithmic structure of FIG. 400 to a UE, as it may be applicable to, for example, an apparatus for a UE. In some embodiments, some or all of operation flow/algorithmic structure 400 may be practiced by components shown or described with respect to apparatus 200. Operation flow/algorithmic structure 400 may include, at 402, providing a message that includes SCI to schedule a physical sidelink shared channel (PSSCH), the SCI to include a bit to indicate rate-matching and transport block size (TBS)-scaling information of the PSSCH. Operation flow/algorithmic structure 400 may further include, at 404, controlling transmission of the message.

In an embodiment, the SCI is in SCI Format 1. In an embodiment, a value of 1 for the bit is to indicate that the PSSCH is to be transmitted with a transmission format that is to include rate-matching and TBS scaling. In an embodiment, a value of 0 for the bit is to indicate that the PSSCH is to be transmitted with a transmission format that is to include puncturing and no TBS scaling. In an embodiment, apparatus 200 is further to cause transmission of the PSSCH.

In an embodiment, the SCI further includes a bit to indicate modulation and coding scheme (MCS) table selection information. In another embodiment, the SCI may include a bit to indicate transmit diversity information. In yet another embodiment, the SCI may include a bit to indicate physical sidelink control channel (PSCCH) power boosting information. Further, some or all of operation flow/algorithmic structure 400 may be practiced by components shown or described with respect to apparatus 300 that provides a message that includes DCI, rather than SCI, where the operation flow/algorithmic structure is an operation flow/algorithmic structure of a base station.

Figure 5:
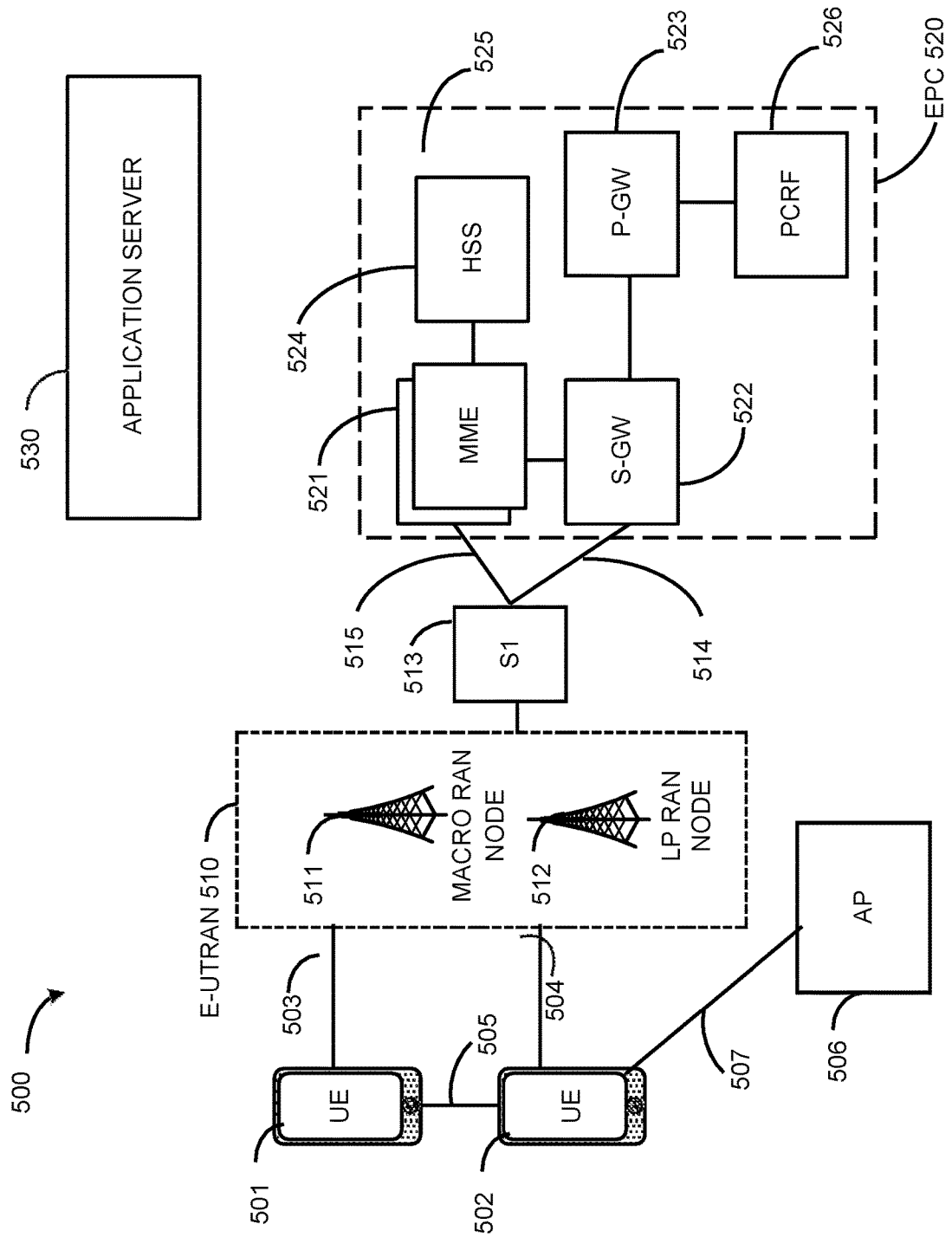
FIG. 5 illustrates an example architecture of a system of a network according to some embodiments.

FIG. 5 illustrates an example architecture of a system 500 of a network according to some embodiments. The system 500 is shown to include a user equipment (UE) 501 and a UE 502. UE 501 or UE 502 may, for example, perform operation flow/algorithmic process 400, or may, for example, be the same or similar to, or additionally or alternatively, include the components of, apparatus 200 discussed previously. The UEs 501 and 502 are illustrated as smartphones (e.g., handheld touchscreen mobile computing devices connectable to one or more cellular networks), but may also comprise any mobile or non-mobile computing device, such as a vehicle, Personal Data Assistants (PDAs), pagers, laptop computers, desktop computers, wireless handsets, or any computing device including a wireless communications interface.

In some embodiments, any of the UEs 501 and 502 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 501 and 502 may be configured to connect, e.g., communicatively couple, with a radio access network (RAN)—in this embodiment, an Evolved Universal Mobile Telecommunications System (UMTS) Terrestrial Radio Access Network (E-UTRAN) 510. The UEs 501 and 502 utilize connections 503 and 504, respectively, each of which comprises a physical communications interface or layer (discussed in further detail below); in this example, the connections 503 and 504 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 501 and 502 may further directly exchange communication data via a ProSe interface 505. The ProSe interface 505 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 502 is shown to be configured to access an access point 506 via connection 507. The connection 507 can comprise a local wireless connection, such as a connection consistent with any IEEE 802.11 protocol, wherein the access point 506 would comprise a wireless fidelity (WiFi®) router. In this example, the access point 506 is shown to be connected to the Internet without connecting to the core network of the wireless system (described in further detail below).

The E-UTRAN 510 can include one or more access nodes that enable the connections 503 and 504. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). These ANs may, for example, be the same or similar to, or additionally or alternatively, include the components of, apparatus 300 discussed previously. The E-UTRAN 510 may include one or more RAN nodes for providing macrocells, e.g., macro RAN node 511, and one or more RAN nodes for providing femtocells or picocells (e.g., cells having smaller coverage areas, smaller user capacity, or higher bandwidth compared to macrocells), e.g., low power (LP) RAN node 512.

Any of the RAN nodes 511 and 512 can terminate the air interface protocol and can be the first point of contact for the UEs 501 and 502. In some embodiments, any of the RAN nodes 511 and 512 can fulfill various logical functions for the E-UTRAN 510 including, but not limited to, radio network controller (RNC) functions such as radio bearer management, uplink and downlink dynamic radio resource management and data packet scheduling, and mobility management.

In accordance with some embodiments, the UEs 501 and 502 can be configured to communicate using Orthogonal Frequency-Division Multiplexing (OFDM) communication signals with each other or with any of the RAN nodes 511 and 512 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 511 and 512 to the UEs 501 and 502, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 501 and 502. The physical downlink control channel (PDCCH) may carry information about the transport format and resource allocations related to the PDSCH channel, among other things. It may also inform the UEs 501 and 502 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 511 and 512 based on channel quality information fed back from any of the UEs 501 and 502. The downlink resource assignment information may be sent on the PDCCH used for (e.g., assigned to) each of the UEs 501 and 502.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The E-UTRAN 510 is shown to be communicatively coupled to a core network—in this embodiment, an Evolved Packet Core (EPC) network 520 via an S1 interface 513. In this embodiment the S1 interface 513 is split into two parts: the S1-U interface 514, which carries traffic data between the RAN nodes 511 and 512 and the serving gateway (S-GW) 522, and the S1-mobility management entity (MME) interface 515, which is a signaling interface between the RAN nodes 511 and 512 and MMEs 521.

In this embodiment, the EPC network 520 comprises the MMEs 521, the S-GW 522, the Packet Data Network (PDN) Gateway (P-GW) 523, and a home subscriber server (HSS) 524. The MMEs 521 may be similar in function to the control plane of legacy Serving General Packet Radio Service (GPRS) Support Nodes (SGSN). The MMEs 521 may manage mobility aspects in access such as gateway selection and tracking area list management. The HSS 524 may comprise a database for network users, including subscription-related information to support the network entities' handling of communication sessions. The EPC network 520 may comprise one or several HSSs 524, depending on the number of mobile subscribers, on the capacity of the equipment, on the organization of the network, etc. For example, the HSS 524 can provide support for routing/roaming, authentication, authorization, naming/addressing resolution, location dependencies, etc.

The S-GW 522 may terminate the S1 interface 513 towards the E-UTRAN 510, and routes data packets between the E-UTRAN 510 and the EPC network 520. In addition, the S-GW 522 may be a local mobility anchor point for inter-RAN node handovers and also may provide an anchor for inter-3GPP mobility. Other responsibilities may include lawful intercept, charging, and some policy enforcement.

The P-GW 523 may terminate an SGi interface toward a PDN. The P-GW 523 may route data packets between the EPC network 523 and external networks such as a network including the application server 530 (alternatively referred to as application function (AF)) via an Internet Protocol (IP) interface 525. Generally, the application server 530 may be an element offering applications that use IP bearer resources with the core network (e.g., UMTS Packet Services (PS) domain, LTE PS data services, etc.). In this embodiment, the P-GW 523 is shown to be communicatively coupled to an application server 530 via an IP communications interface 525. The application server 530 can also be configured to support one or more communication services (e.g., Voice-over-Internet Protocol (VoIP) sessions, PTT sessions, group communication sessions, social networking services, etc.) for the UEs 501 and 502 via the EPC network 520.

The P-GW 523 may further be a node for policy enforcement and charging data collection. Policy and Charging Enforcement Function (PCRF) 526 is the policy and charging control element of the EPC network 520. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 526 may be communicatively coupled to the application server 530 via the P-GW 523. The application server 530 may signal the PCRF 526 to indicate a new service flow and select the appropriate Quality of Service (QoS) and charging parameters. The PCRF 526 may provision this rule into a Policy and Charging Enforcement Function (PCEF) (not shown) with the appropriate traffic flow template (TFT) and QoS class of identifier (QCI), which commences the QoS and charging as specified by the application server 530.

Figure 6:
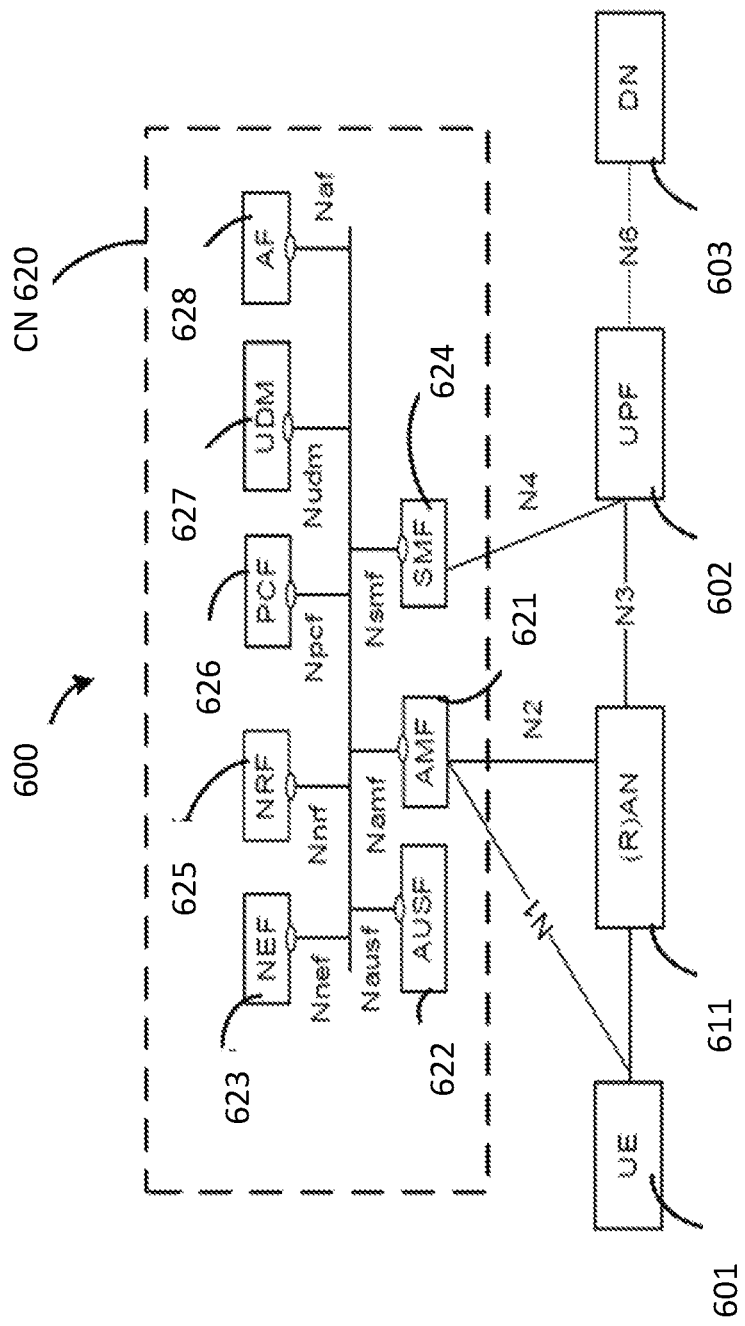
FIG. 6 illustrates an example architecture of another system of a network according to some embodiments.

FIG. 6 illustrates an architecture of a system 600 of a network in accordance with some embodiments. The system 600 is shown to include a UE 601, which may be the same or similar to UEs 501 and 502 discussed previously; a RAN node 611, which may be the same or similar to RAN nodes 511 and 512 discussed previously; a User Plane Function (UPF) 602; a Data network (DN) 603, which may be, for example, operator services, Internet access or 3rd party services; and a 5G Core Network (5GC or CN) 620. UE 601 may, for example, perform operation flow/algorithmic process 400, or may, for example, be the same or similar to, or additionally or alternatively, include the components of, apparatus 200 discussed previously.

The CN 620 may include an Authentication Server Function (AUSF) 622; a Core Access and Mobility Management Function (AMF) 621; a Session Management Function (SMF) 624; a Network Exposure Function (NEF) 623; a Policy Control function (PCF) 626; a Network Function (NF) Repository Function (NRF) 625; a Unified Data Management (UDM) 627; and an Application Function (AF) 628. The CN 620 may also include other elements that are not shown, such as a Structured Data Storage network function (SDSF), an Unstructured Data Storage network function (UDSF), and the like.

The UPF 602 may act as an anchor point for intra-RAT and inter-RAT mobility, an external PDU session point of interconnect to DN 603, and a branching point to support multi-homed PDU session. The UPF 602 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 602 may include an uplink classifier to support routing traffic flows to a data network. The DN 603 may represent various network operator services, Internet access, or third party services. NY 603 may include, or be similar to application server 530 discussed previously.

The AUSF 622 may store data for authentication of UE 601 and handle authentication related functionality. Further, the AUSF 622 may facilitate a common authentication framework for various access types.

The AMF 621 may be responsible for registration management (e.g., for registering UE 601, etc.), connection management, reachability management, mobility management, and lawful interception of AMF-related events, and access authentication and authorization. AMF 621 may provide transport for SM messages between and SMF 624, and act as a transparent proxy for routing SM messages. AMF 621 may also provide transport for short message service (SMS) messages between UE 601 and an SMS function (SMSF) (not shown by FIG. 6). AMF 621 may act as Security Anchor Function (SEA), which may include interaction with the AUSF 622 and the UE 601, receipt of an intermediate key that was established as a result of the UE 601 authentication process. Where USIM based authentication is used, the AMF 621 may retrieve the security material from the AUSF 622. AMF 621 may also include a Security Context Management (SCM) function, which receives a key from the SEA that it uses to derive access-network specific keys. Furthermore, AMF 621 may be a termination point of RAN CP interface (N2 reference point), a termination point of NAS (N1) signalling, and perform NAS ciphering and integrity protection.

AMF 621 may also support NAS signalling with a UE 601 over an N3 interworking-function (IWF) interface. The N3IWF may be used to provide access to untrusted entities. N33IWF may be a termination point for the N2 and N3 interfaces for control plane and user plane, respectively, and as such, may handle N2 signalling from SMF and AMF for PDU sessions and QoS, encapsulate/de-encapsulate packets for IPSec and N3 tunnelling, mark N3 user-plane packets in the uplink, and enforce QoS corresponding to N3 packet marking taking into account QoS requirements associated to such marking received over N2. N3IWF may also relay uplink and downlink control-plane NAS (N1) signalling between the UE 601 and AMF 621, and relay uplink and downlink user-plane packets between the UE 601 and UPF 602. The N3IWF also provides mechanisms for IPsec tunnel establishment with the UE 601.

The SMF 624 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. The SMF 624 may include the following roaming functionality: handle local enforcement to apply QoS SLAB (VPLMN); charging data collection and charging interface (VPLMN); lawful intercept (in VPLMN for SM events and interface to LI System); support for interaction with external DN for transport of signalling for PDU session authorization/authentication by external DN.

The NEF 623 may provide means for securely exposing the services and capabilities provided by 3GPP network functions for third party, internal exposure/re-exposure, Application Functions (e.g., AF 628), edge computing or fog computing systems, etc. In such embodiments, the NEF 623 may authenticate, authorize, and/or throttle the AFs. NEF 623 may also translate information exchanged with the AF 628 and information exchanged with internal network functions. For example, the NEF 623 may translate between an AF-Service-Identifier and an internal 5GC information. NEF 623 may also receive information from other network functions (NFs) based on exposed capabilities of other network functions. This information may be stored at the NEF 623 as structured data, or at a data storage NF using a standardized interfaces. The stored information can then be re-exposed by the NEF 623 to other NFs and AFs, and/or used for other purposes such as analytics.

The NRF 625 may support service discovery functions, receive NF Discovery Requests from NF instances, and provide the information of the discovered NF instances to the NF instances. NRF 625 also maintains information of available NF instances and their supported services.

The PCF 626 may provide policy rules to control plane function(s) to enforce them, and may also support unified policy framework to govern network behaviour. The PCF 626 may also implement a front end (FE) to access subscription information relevant for policy decisions in a UDR of UDM 627.

The UDM 627 may handle subscription-related information to support the network entities' handling of communication sessions, and may store subscription data of UE 601. The UDM 627 may include two parts, an application FE and a User Data Repository (UDR). The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with PCF 626. UDM 627 may also support SMS management, wherein an SMS-FE implements the similar application logic as discussed previously.

The AF 628 may provide application influence on traffic routing, access to the Network Capability Exposure (NCE), and interact with the policy framework for policy control. The NCE may be a mechanism that allows the 5GC and AF 628 to provide information to each other via NEF 623, which may be used for edge computing implementations. In such implementations, the network operator and third party services may be hosted close to the UE 601 access point of attachment to achieve an efficient service delivery through the reduced end-to-end latency and load on the transport network. For edge computing implementations, the 5GC may select a UPF 602 close to the UE 601 and execute traffic steering from the UPF 602 to DN 603 via the N6 interface. This may be based on the UE subscription data, UE location, and information provided by the AF 628. In this way, the AF 628 may influence UPF (re)selection and traffic routing. Based on operator deployment, when AF 628 is considered to be a trusted entity, the network operator may permit AF 628 to interact directly with relevant NFs.

As discussed previously, the CN 620 may include an SMSF, which may be responsible for SMS subscription checking and verification, and relaying SM messages to/from the UE 601 to/from other entities, such as an SMS-GMSC/IWMSC/SMS-router. The SMS may also interact with AMF 621 and UDM 627 for notification procedure that the UE 601 is available for SMS transfer (e.g., set a UE not reachable flag, and notifying UDM 627 when UE 601 is available for SMS).

The system 600 may include the following service-based interfaces: Namf: Service-based interface exhibited by AMF; Nsmf: Service-based interface exhibited by SMF; Nnef: Service-based interface exhibited by NEF; Npcf: Service-based interface exhibited by PCF; Nudm: Service-based interface exhibited by UDM; Service-based interface exhibited by AF; Nnrf: Service-based interface exhibited by NRF; and Nausf: Service-based interface exhibited by AUSF.

The system 600 may include the following reference points: N1: Reference point between the UE and the AMF; N2: Reference point between the (R)AN and the AMF; N3: Reference point between the (R)AN and the UPF; N4: Reference point between the SMF and the UPF; and N6: Reference point between the UPF and a Data Network. There may be many more reference points and/or service-based interfaces between the NF services in the NFs, however, these interfaces and reference points have been omitted for clarity. For example, an N5 reference point may be between the PCF and the AF; an N7 reference point may be between the PCF and the SMF; an N11 reference point between the AMF and SMF; etc. In some embodiments, the CN 620 may include an Nx interface, which is an inter-CN interface between the MME (e.g., MME 521) and the AMF 621 in order to enable interworking between CN 620 and EPC network 520.

Although not shown by FIG. 6, system 600 may include multiple RAN nodes 611 wherein an Xn interface is defined between two or more RAN nodes 611 (e.g., gNBs and the like) that connecting to 5GC 620, between a RAN node 611 (e.g., gNB) connecting to 5GC 620 and an eNB (e.g., a RAN node 511 of FIG. 5), and/or between two eNBs connecting to 5GC 620.

In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 601 in a connected mode (e.g., CM-CONNECTED) including functionality to manage the UE mobility for connected mode between one or more RAN nodes 611. The mobility support may include context transfer from an old (source) serving RAN node 611 to new (target) serving RAN node 611; and control of user plane tunnels between old (source) serving RAN node 611 to new (target) serving RAN node 611.

A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

Figure 7:
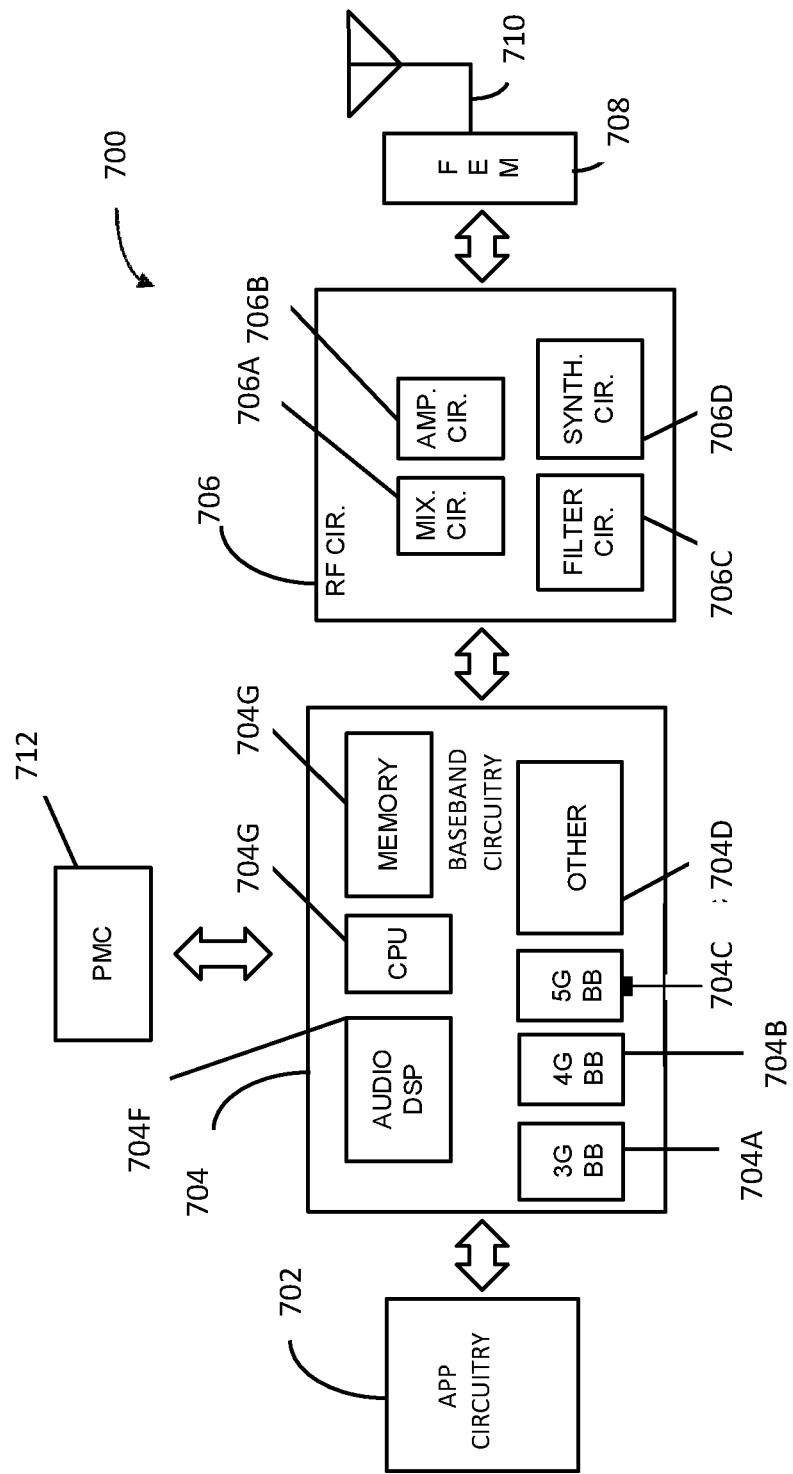
FIG. 7 illustrates example components of a device according to some embodiments.

FIG. 7 illustrates example components of a device 700 in accordance with some embodiments. In some embodiments, the device 700 may include application circuitry 702, baseband circuitry 704, Radio Frequency (RF) circuitry 706, front-end module (FEM) circuitry 708, one or more antennas 710, and power management circuitry (PMC) 712 coupled together at least as shown. The components of the illustrated device 700 may be included in a UE, which may, for example, perform operation flow/algorithmic process 400, or may, for example, include the components of apparatus 200 discussed previously, or a RAN node, which may, for example, include the components of apparatus 300 discussed previously. In some embodiments, the device 700 may include less elements (e.g., a RAN node may not utilize application circuitry 702, and instead include a processor/controller to process IP data received from an EPC). In some embodiments, the device 700 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 702 may include one or more application processors. For example, the application circuitry 702 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 700. In some embodiments, processors of application circuitry 702 may process IP data packets received from an EPC.

The baseband circuitry 704 may include circuitry such as, but not limited to, one or more single-core or multi-core processors. The baseband circuitry 704 may include one or more baseband processors or control logic to process baseband signals received from a receive signal path of the RF circuitry 706 and to generate baseband signals for a transmit signal path of the RF circuitry 706. Baseband processing circuitry 704 may interface with the application circuitry 702 for generation and processing of the baseband signals and for controlling operations of the RF circuitry 706. For example, in some embodiments, the baseband circuitry 704 may include a third generation (3G) baseband processor 704A, a fourth generation (4G) baseband processor 704B, a fifth generation (5G) baseband processor 704C, or other baseband processor(s) 704D for other existing generations, generations in development or to be developed in the future (e.g., second generation (2G), si11h generation (6G), etc.). The baseband circuitry 704 (e.g., one or more of baseband processors 704A-D) may handle various radio control functions that enable communication with one or more radio networks via the RF circuitry 706. In other embodiments, some or all of the functionality of baseband processors 704A-D may be included in modules stored in the memory 704G and executed via a Central Processing Unit (CPU) 704E. The radio control functions may include, but are not limited to, signal modulation/demodulation, encoding/decoding, radio frequency shifting, etc. In some embodiments, modulation/demodulation circuitry of the baseband circuitry 704 may include Fast-Fourier Transform (FFT), precoding, or constellation mapping/demapping functionality. In some embodiments, encoding/decoding circuitry of the baseband circuitry 704 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 704 may include one or more audio digital signal processor(s) (DSP) 704F. The audio DSP(s) 704F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 704 and the application circuitry 702 may be implemented together such as, for example, on a system on a chip (SOC).

In some embodiments, the baseband circuitry 704 may provide for communication compatible with one or more radio technologies. For example, in some embodiments, the baseband circuitry 704 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 704 is configured to support radio communications of more than one wireless protocol may be referred to as multi-mode baseband circuitry.

RF circuitry 706 may enable communication with wireless networks using modulated electromagnetic radiation through a non-solid medium. In various embodiments, the RF circuitry 706 may include switches, filters, amplifiers, etc. to facilitate the communication with the wireless network. RF circuitry 706 may include a receive signal path which may include circuitry to down-convert RF signals received from the FEM circuitry 708 and provide baseband signals to the baseband circuitry 704. RF circuitry 706 may also include a transmit signal path which may include circuitry to up-convert baseband signals provided by the baseband circuitry 704 and provide RF output signals to the FEM circuitry 708 for transmission.

In some embodiments, the receive signal path of the RF circuitry 706 may include mixer circuitry 706a, amplifier circuitry 706b and filter circuitry 706c. In some embodiments, the transmit signal path of the RF circuitry 706 may include filter circuitry 706c and mixer circuitry 706a. RF circuitry 706 may also include synthesizer circuitry 706d for synthesizing a frequency for use by the mixer circuitry 706a of the receive signal path and the transmit signal path. In some embodiments, the mixer circuitry 706a of the receive signal path may be configured to down-convert RF signals received from the FEM circuitry 708 based on the synthesized frequency provided by synthesizer circuitry 706d. The amplifier circuitry 706b may be configured to amplify the down-converted signals and the filter circuitry 706c may be a low-pass filter (LPF) or band-pass filter (BPF) configured to remove unwanted signals from the down-converted signals to generate output baseband signals. Output baseband signals may be provided to the baseband circuitry 704 for further processing. In some embodiments, the output baseband signals may be zero-frequency baseband signals, although this is not a requirement. In some embodiments, mixer circuitry 706a of the receive signal path may comprise passive mixers, although the scope of the embodiments is not limited in this respect.

In some embodiments, the mixer circuitry 706a of the transmit signal path may be configured to up-convert input baseband signals based on the synthesized frequency provided by the synthesizer circuitry 706d to generate RF output signals for the FEM circuitry 708. The baseband signals may be provided by the baseband circuitry 704 and may be filtered by filter circuitry 706c.

In some embodiments, the mixer circuitry 706a of the receive signal path and the mixer circuitry 706a of the transmit signal path may include two or more mixers and may be arranged for quadrature downconversion and upconversion, respectively. In some embodiments, the mixer circuitry 706a of the receive signal path and the mixer circuitry 706a of the transmit signal path may include two or more mixers and may be arranged for image rejection (e.g., Hartley image rejection). In some embodiments, the mixer circuitry 706a of the receive signal path and the mixer circuitry 706a may be arranged for direct downconversion and direct upconversion, respectively. In some embodiments, the mixer circuitry 706a of the receive signal path and the mixer circuitry 706a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 706 may include analog-to-digital converter (ADC) and digital-to-analog converter (DAC) circuitry and the baseband circuitry 704 may include a digital baseband interface to communicate with the RF circuitry 706.

In some dual-mode embodiments, a separate radio IC circuitry may be provided for processing signals for each spectrum, although the scope of the embodiments is not limited in this respect.

In some embodiments, the synthesizer circuitry 706d may be a fractional-N synthesizer or a fractional N/N+1 synthesizer, although the scope of the embodiments is not limited in this respect as other types of frequency synthesizers may be suitable. For example, synthesizer circuitry 706d may be a delta-sigma synthesizer, a frequency multiplier, or a synthesizer comprising a phase-locked loop with a frequency divider.

The synthesizer circuitry 706d may be configured to synthesize an output frequency for use by the mixer circuitry 706a of the RF circuitry 706 based on a frequency input and a divider control input. In some embodiments, the synthesizer circuitry 706d may be a fractional N/N+1 synthesizer.

In some embodiments, frequency input may be provided by a voltage controlled oscillator (VCO), although that is not a requirement. Divider control input may be provided by either the baseband circuitry 704 or the applications processor 702 depending on the desired output frequency. In some embodiments, a divider control input (e.g., N) may be determined from a look-up table based on a channel indicated by the applications processor 702.

Synthesizer circuitry 706d of the RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 706d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 706 may include an IQ/polar converter.

FEM circuitry 708 may include a receive signal path which may include circuitry configured to operate on RF signals received from one or more antennas 710, amplify the received signals and provide the amplified versions of the received signals to the RF circuitry 706 for further processing. FEM circuitry 708 may also include a transmit signal path which may include circuitry configured to amplify signals for transmission provided by the RF circuitry 706 for transmission by one or more of the one or more antennas 710. In various embodiments, the amplification through the transmit or receive signal paths may be done solely in the RF circuitry 706, solely in the FEM 708, or in both the RF circuitry 706 and the FEM 708.

In some embodiments, the FEM circuitry 708 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 706). The transmit signal path of the FEM circuitry 708 may include a power amplifier (PA) to amplify input RF signals (e.g., provided by RF circuitry 706), and one or more filters to generate RF signals for subsequent transmission (e.g., by one or more of the one or more antennas 710).

In some embodiments, the PMC 712 may manage power provided to the baseband circuitry 704. In particular, the PMC 712 may control power-source selection, voltage scaling, battery charging, or DC-to-DC conversion. The PMC 712 may often be included when the device 700 is capable of being powered by a battery, for example, when the device is included in a UE. The PMC 712 may increase the power conversion efficiency while providing desirable implementation size and heat dissipation characteristics.

FIG. 7 shows the PMC 712 coupled only with the baseband circuitry 704. However, in other embodiments, the PMC 712 may be additionally or alternatively coupled with, and perform similar power management operations for, other components such as, but not limited to, application circuitry 702, RF circuitry 706, or FEM 708.

In some embodiments, the PMC 712 may control, or otherwise be part of, various power saving mechanisms of the device 700. For example, if the device 700 is in an RRC_Connected state, where it is still connected to the RAN node as it expects to receive traffic shortly, then it may enter a state known as Discontinuous Reception Mode (DRX) after a period of inactivity. During this state, the device 700 may power down for brief intervals of time and thus save power.

If there is no data traffic activity for an extended period of time, then the device 700 may transition off to an RRC_Idle state, where it disconnects from the network and does not perform operations such as channel quality feedback, handover, etc. The device 700 goes into a very low power state and it performs paging where again it periodically wakes up to listen to the network and then powers down again. The device 700 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 702 and processors of the baseband circuitry 704 may be used to execute elements of one or more instances of a protocol stack. For example, processors of the baseband circuitry 704, alone or in combination, may be used execute Layer 3, Layer 2, or Layer 1 functionality, while processors of the application circuitry 704 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 8:
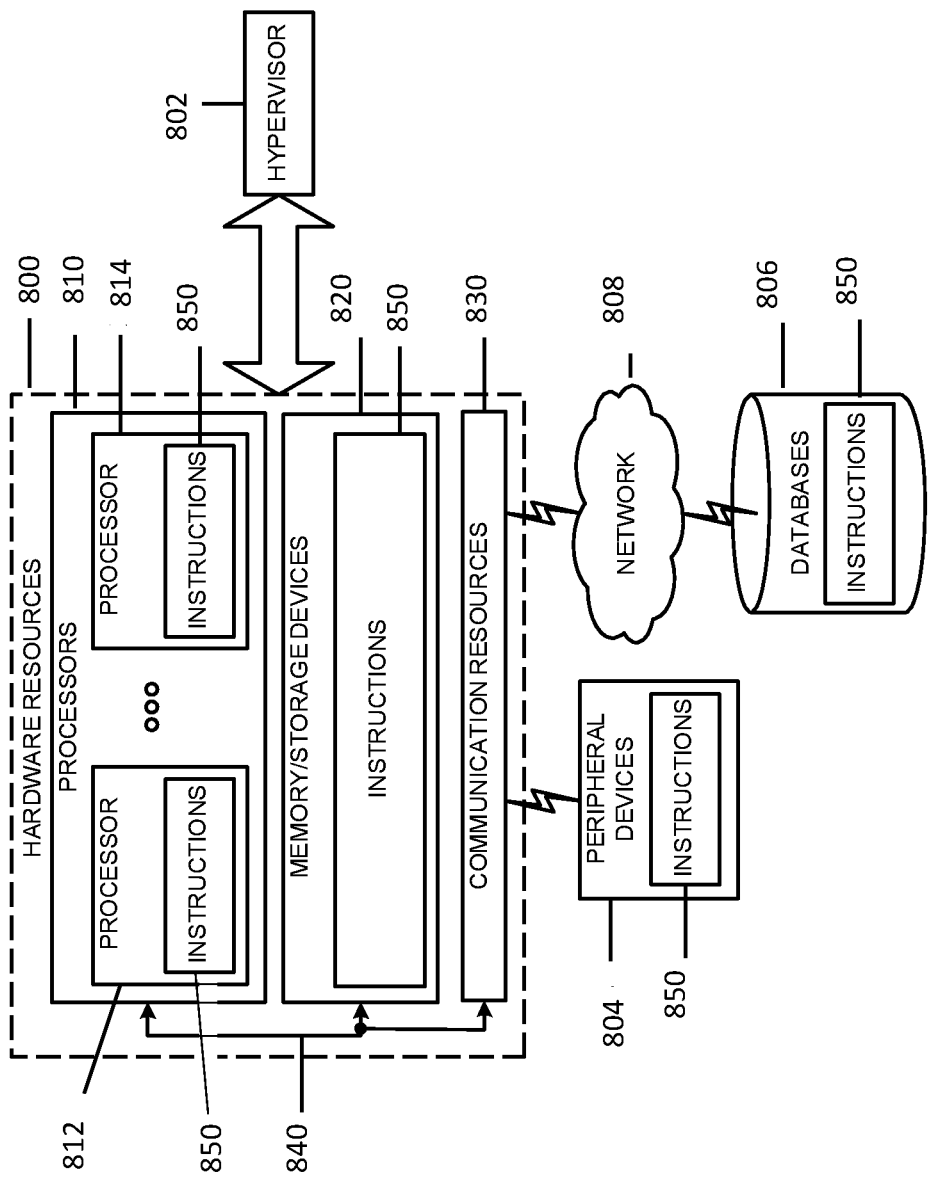
FIG. 8 illustrates an example block diagram illustrating components according to some embodiments.

FIG. 8 is an example block diagram illustrating components according to some example embodiments, able to read instructions from a machine-readable or computer-readable medium (e.g., a non-transitory machine-readable storage medium) and perform any one or more of the methodologies discussed herein, including, for example, but not limited to, operation flow/algorithmic process 400. Specifically, FIG. 8 shows a diagrammatic representation of hardware resources 800 including one or more processors (or processor cores) 810, one or more memory/storage devices 820, and one or more communication resources 830, each of which may be communicatively coupled via a bus 840. For embodiments where node virtualization (e.g., NFV) is utilized, a hypervisor 802 may be executed to provide an execution environment for one or more network slices/sub-slices to utilize the hardware resources 800.

The processors 810 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 812 and a processor 814.

The memory/storage devices 820 may include main memory, disk storage, or any suitable combination thereof. The memory/storage devices 820 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc. The memory/storage devices 820 may store data for operations by one or more processors that may execute the instructions of operation flow/algorithmic structure 700, where such data may include, for example, transmit diversity scheme information, which may include, for example, the identity and associated parameters of a transmit diversity scheme. Further, the memory/storage devices 820 may store data for operations by one or more processors that may execute the instructions of operation flow/algorithmic structure 800, where such data may include, for example, PDCCH DMRS information.

The communication resources 830 may include interconnection or network interface components or other suitable devices to communicate with one or more peripheral devices 804 or one or more databases 806 via a network 808. For example, the communication resources 830 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 850 may comprise software, a program, an application, an applet, an app, or other executable code for causing at least any of the processors 810 to perform any one or more of the methodologies discussed herein. The instructions 850 may reside, completely or partially, within at least one of the processors 810 (e.g., within the processor's cache memory), the memory/storage devices 820, or any suitable combination thereof. Furthermore, any portion of the instructions 850 may be transferred to the hardware resources 800 from any combination of the peripheral devices 804 or the databases 806. Accordingly, the memory of processors 810, the memory/storage devices 820, the peripheral devices 804, and the databases 806 are examples of computer-readable and machine-readable media.

Figure 9:
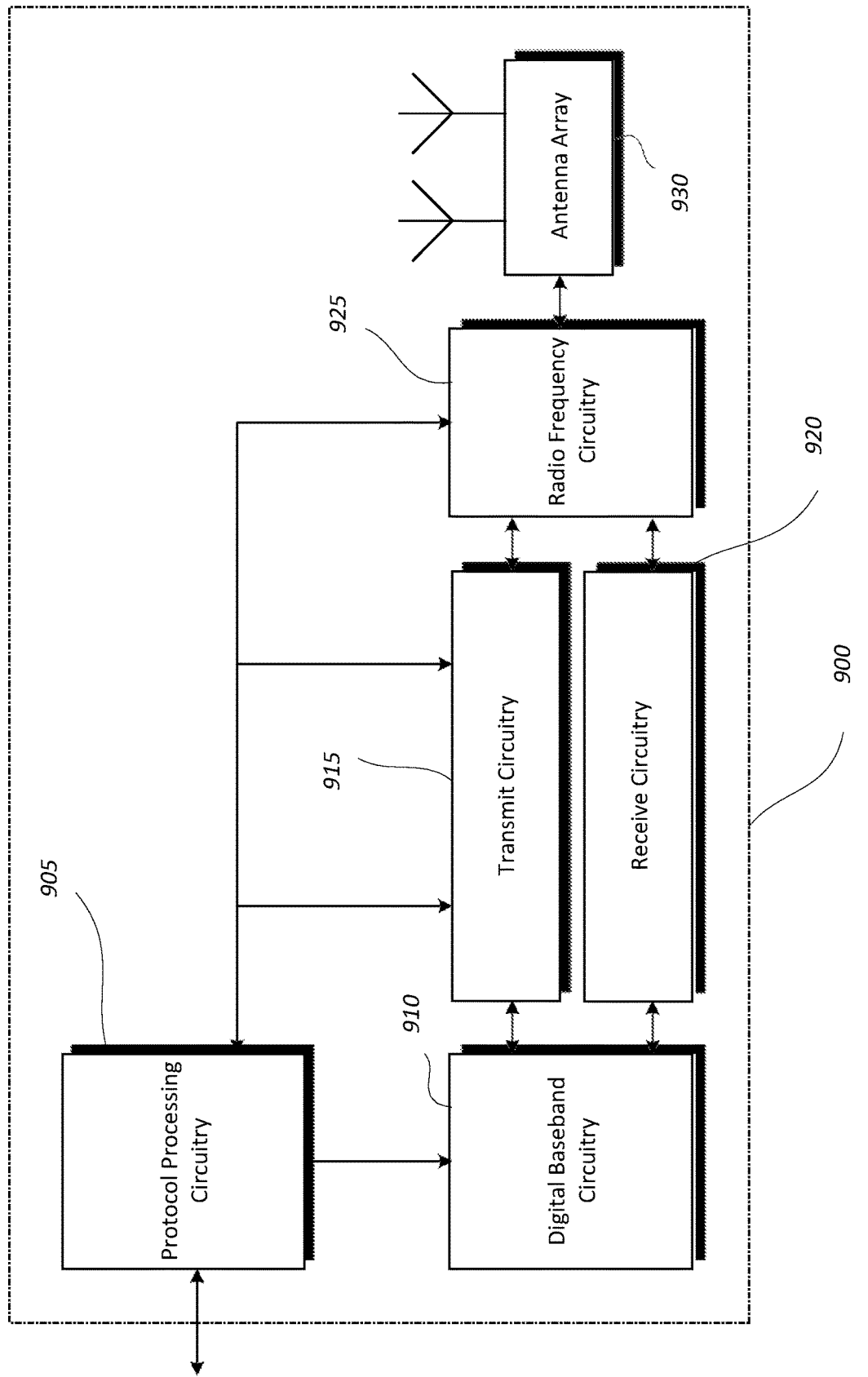
FIG. 9 illustrates an exemplary communication circuitry according to some embodiments.

FIG. 9 illustrates an exemplary communication circuitry 900 according to some aspects. Circuitry 900 is alternatively grouped according to functions. Components as shown in circuitry 900 are shown here for illustrative purposes and may include other components not shown in FIG. 9. Circuitry 900 may, for example, be included in apparatus 200 or apparatus 300 discussed previously.

Communication circuitry 900 may include protocol processing circuitry 905, which may implement one or more of medium access control (MAC), radio link control (RLC), packet data convergence protocol (PDCP), radio resource control (RRC) and non-access stratum (NAS) functions. Protocol processing circuitry 905 may include one or more processing cores (not shown) to execute instructions and one or more memory structures (not shown) to store program and data information. Protocol processing circuitry 905 may, for example, perform operation flow/algorithmic process 400.

Communication circuitry 900 may further include digital baseband circuitry 910, which may implement physical layer (PHY) functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

Communication circuitry 900 may further include transmit circuitry 915, receive circuitry 920 and/or antenna array circuitry 930.

Communication circuitry 900 may further include radio frequency (RF) circuitry 925. In an aspect of the embodiments herein, RF circuitry 925 may include multiple parallel RF chains for one or more of transmit or receive functions, each connected to one or more antennas of the antenna array 930.

In an aspect of the disclosure, protocol processing circuitry 905 may include one or more instances of control circuitry (not shown) to provide control functions for one or more of digital baseband circuitry 910, transmit circuitry 915, receive circuitry 920, and/or radio frequency circuitry 925.

Figure 10:
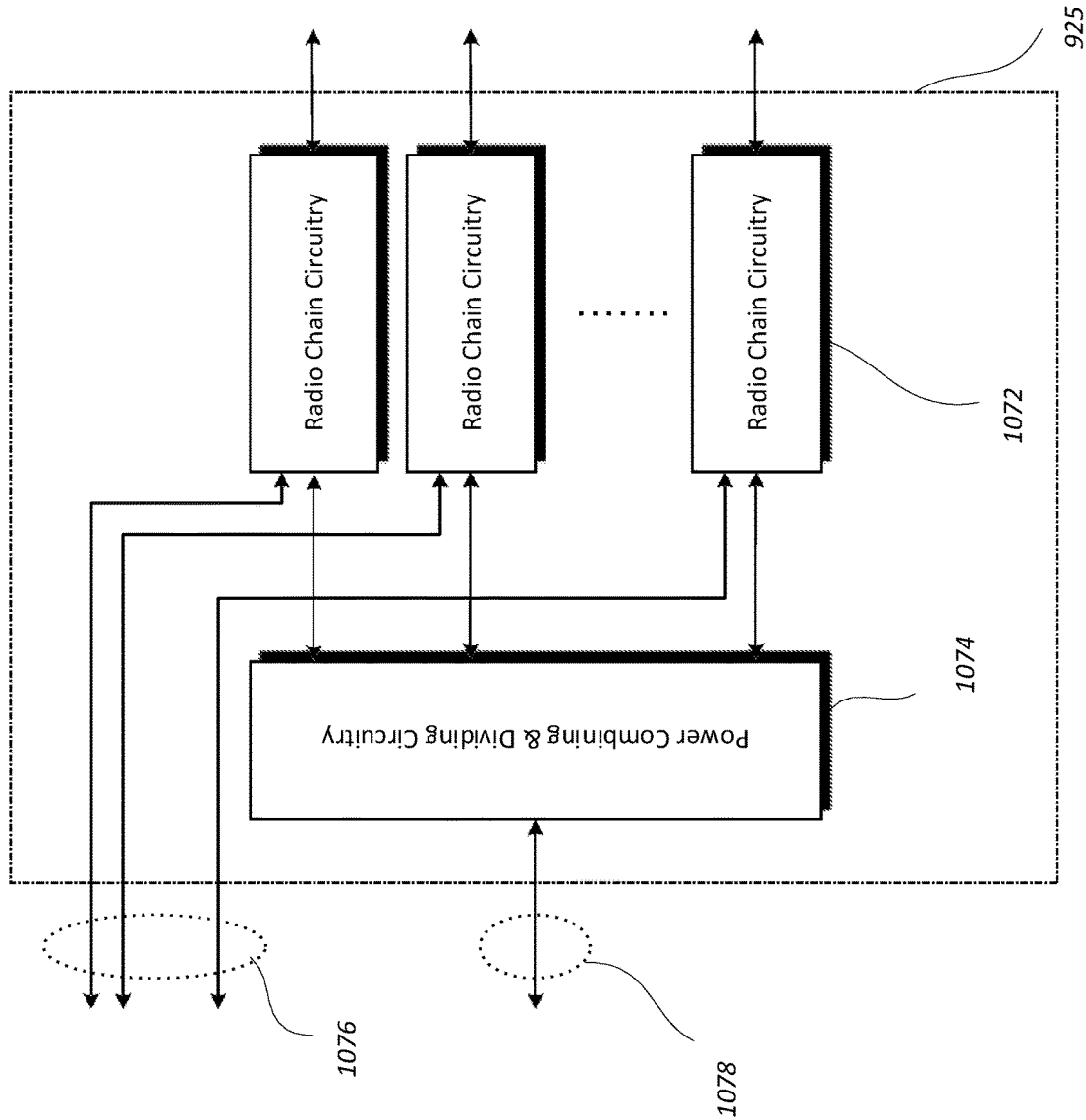
FIG. 10 illustrates an exemplary radio frequency circuitry according to some embodiments.

FIG. 10 illustrates an exemplary radio frequency circuitry 925 in FIG. 9 according to some aspects.

Radio frequency circuitry 925 may include one or more instances of radio chain circuitry 1072, which in some aspects may include one or more filters, power amplifiers, low noise amplifiers, programmable phase shifters and power supplies (not shown).

Radio frequency circuitry 925 may include power combining and dividing circuitry 1074 in some aspects. In some aspects, power combining and dividing circuitry 1074 may operate bidirectionally, such that the same physical circuitry may be configured to operate as a power divider when the device is transmitting, and as a power combiner when the device is receiving. In some aspects, power combining and dividing circuitry 1074 may one or more include wholly or partially separate circuitries to perform power dividing when the device is transmitting and power combining when the device is receiving. In some aspects, power combining and dividing circuitry 1074 may include passive circuitry comprising one or more two-way power divider/combiners arranged in a tree. In some aspects, power combining and dividing circuitry 1074 may include active circuitry comprising amplifier circuits.

In some aspects, radio frequency circuitry 925 may connect to transmit circuitry 915 and receive circuitry 920 in FIG. 9 via one or more radio chain interfaces 1076 or a combined radio chain interface 1078.

In some aspects, one or more radio chain interfaces 1076 may provide one or more interfaces to one or more receive or transmit signals, each associated with a single antenna structure which may comprise one or more antennas.

In some aspects, the combined radio chain interface 1078 may provide a single interface to one or more receive or transmit signals, each associated with a group of antenna structures comprising one or more antennas.

Figure 11:
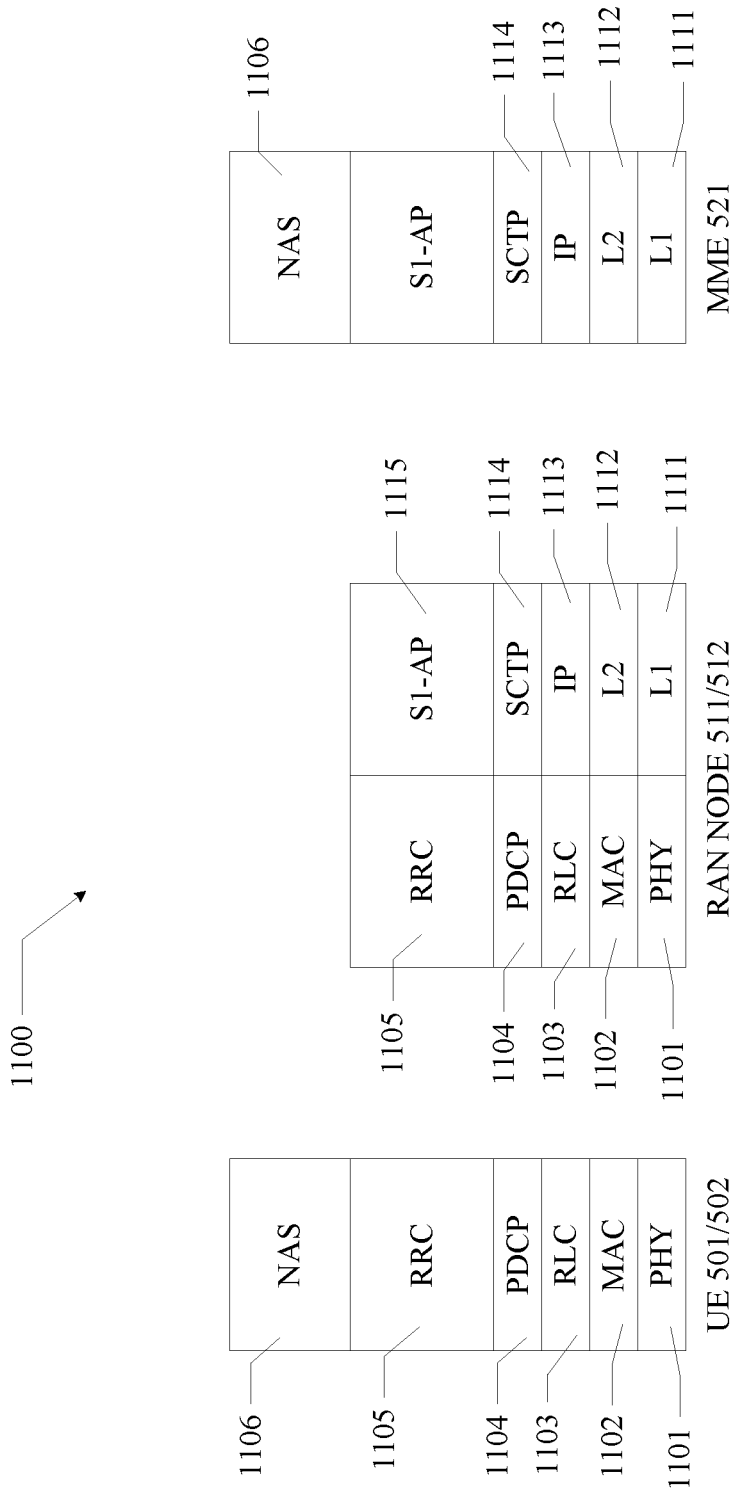
FIG. 11 illustrates an exemplary control plane protocol stack according to some embodiments.

FIG. 11 is an exemplary control plane protocol stack in accordance with some embodiments. In this embodiment, a control plane 1100 is shown as a communications protocol stack between the UE 501 (or alternatively, the UE 502), which may, for example, perform operation flow/algorithmic process 400, or may, for example, be the same as or similar to, or alternatively or additionally, include the components of, apparatus 200 discussed previously, RAN node 511 (or alternatively, the RAN node 512), which may, for example, be the same as or similar to, or alternatively or additionally, include the components of, apparatus 300 discussed previously, and the MME 521.

The PHY layer 1101 may transmit or receive information used by the MAC layer 1102 over one or more air interfaces. The PHY layer 1101 may further perform link adaptation or adaptive modulation and coding (AMC), power control, cell search (e.g., for initial synchronization and handover purposes), and other measurements used by higher layers, such as the RRC layer 1105. The PHY layer 1101 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 1102 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 1103 may operate in a plurality of modes of operation, including: Transparent Mode (TM), Unacknowledged Mode (UM), and Acknowledged Mode (AM). The RLC layer 1103 may execute transfer of upper layer protocol data units (PDUs), error correction through automatic repeat request (ARQ) for AM data transfers, and concatenation, segmentation and reassembly of RLC SDUs for UM and AM data transfers. The RLC layer 1103 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 1104 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 1105 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 501 and the RAN node 511 may utilize a Uu interface (e.g., an LTE-Uu interface) to exchange control plane data via a protocol stack comprising the PHY layer 1101, the MAC layer 1102, the RLC layer 1103, the PDCP layer 1104, and the RRC layer 1105.

The non-access stratum (NAS) protocols 1106 form the highest stratum of the control plane between the UE 501 and the MME 521. The NAS protocols 1106 support the mobility of the UE 501 and the session management procedures to establish and maintain IP connectivity between the UE 501 and the P-GW 523.

The S1 Application Protocol (S1-AP) layer 1115 may support the functions of the S1 interface and comprise Elementary Procedures (EPs). An EP is a unit of interaction between the RAN node 511 and the CN 520. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 1114 may ensure reliable delivery of signaling messages between the RAN node 511 and the MME 521 based, in part, on the IP protocol, supported by the IP layer 1113. The L2 layer 1112 and the L1 layer 1111 may refer to communication links (e.g., wired or wireless) used by the RAN node and the MME to exchange information.

The RAN node 511 and the MME 521 may utilize an S1-MME interface to exchange control plane data via a protocol stack comprising the L1 layer 1111, the L2 layer 1112, the IP layer 1113, the SCTP layer 1114, and the S1-AP layer 1115.

In some embodiments, the combined radio chain interface 1478 may be used for millimeter wave communications, while the one or more radio chain interfaces 1476 may be used for lower-frequency communications.

Some non-limiting examples are provided below.

EXAMPLES

Example 1 may include one or more non-transitory computer-readable media having instructions that, when executed by one or more processors, cause an apparatus of a user equipment (UE) to: provide a message that includes sidelink control information (SCI) to schedule a physical sidelink shared channel (PSSCH), the SCI to include a bit to indicate rate-matching and transport block size (TBS)-scaling information of the PSSCH; and control transmission of the message.

Example 2 may include the one or more non-transitory computer-readable media of Example 1 or some other example herein, wherein the SCI is in an SCI Format 1.

Example 3 may include the one or more non-transitory computer-readable media of Example 1 or 2 or some other example herein, wherein a value of 1 for the bit is to indicate that the PSSCH is to be transmitted with a transmission format that is to include rate-matching and TBS scaling.

Example 4 may include the one or more non-transitory computer-readable media of Example 1 or 2 or some other example herein, wherein a value of 0 for the bit is to indicate that the PSSCH is to be transmitted with a transmission format that is to include puncturing and no TBS scaling.

Example 5 may include the one or more non-transitory computer-readable media of Example 1 or 2 or some other example herein, wherein the instructions, when executed by the one or more processors, further cause the apparatus to: cause transmission of the PSSCH.

Example 6 may include the one or more non-transitory computer-readable media of Example 1 or 2 or some other example herein, wherein the SCI is further to include a bit to indicate modulation and coding scheme (MCS) table selection information.

Example 7 may include the one or more non-transitory computer-readable media of Example 1 or 2 or some other example herein, wherein the SCI is to further to include a bit to indicate transmit diversity information.

Example 8 may include the one or more non-transitory computer-readable media of Example 1 or 2 or some other example herein, wherein the SCI is further to include a bit to indicate physical sidelink control channel (PSCCH) power boosting information.

Example 9 may include an apparatus to be implemented in a user equipment (UE), the apparatus comprising: processing circuitry, to: provide a message that includes sidelink control information (SCI) to schedule a physical sidelink shared channel (PSSCH), the SCI to include a bit to indicate rate-matching and transport block size (TBS)-scaling information of the PSSCH, and control transmission of the message; and memory, coupled with the processing circuitry, to store the SCI.

Example 10 may include the apparatus of Example 9 or some other example herein, wherein the SCI is in an SCI Format 1.

Example 11 may include the apparatus of Example 9 or 10 or some other example herein, wherein a value of 1 for the bit is to indicate that the PSSCH is to be transmitted with a transmission format that is to include rate-matching and TBS scaling.

Example 12 may include the apparatus of Example 9 or 10 or some other example herein, wherein a value of 0 for the bit is to indicate that the PSSCH is to be transmitted with a transmission format that is to include puncturing and no TBS scaling.

Example 13 may include the apparatus of Example 9 or 10 or some other example herein, wherein the SCI is further to include a bit to indicate modulation and coding scheme (MCS) table selection information.

Example 14 may include the apparatus of Example 9 or 10 or some other example herein, wherein the SCI is to further to include a bit to indicate transmit diversity information.

Example 15 may include the apparatus of Example 9 or 10 or some other example herein, wherein the SCI is further to include a bit to indicate physical sidelink control channel (PSCCH) power boosting information.

Example 16 may include one or more non-transitory computer-readable media having instructions that, when executed by one or more processors, cause an apparatus of a base station to: provide a message that includes downlink control information (DCI) to schedule a physical sidelink shared channel (PSSCH), the DCI to include a bit to indicate information of the PSSCH; and control transmission of the message.

Example 17 may include the one or more non-transitory computer-readable media of Example 16 or some other example herein, wherein the DCI is in a DCI Format 5A.

Example 18 may include the one or more non-transitory computer-readable media of Example 16 or 17 or some other example herein, wherein the bit is to indicate rate-matching information of the PSSCH.

Example 19 may include the one or more non-transitory computer-readable media of Example 16 or 17 or some other example herein, wherein the bit is to indicate modulation and coding scheme (MCS) table selection information of the PSSCH.

Example 20 may include the one or more non-transitory computer-readable media of Example 16 or 17 or some other example herein, wherein the bit is to indicate transmit diversity information of the PSSCH.

Example 21 may include one or more non-transitory computer-readable media having instructions that, when executed by one or more processors, cause an apparatus of a user equipment (UE) to: provide a message that includes sidelink control information (SCI) to schedule a physical sidelink shared channel (PSSCH), the SCI to include one or more bits to indicate information of the PSSCH; and control transmission of the message.

Example 22 may include the one or more non-transitory computer-readable media of Example 21 or some other example herein, wherein the one or more bits are to indicate that the PSSCH is to be transmitted with transport block size (TBS) scaling, and wherein the one or more bits are to identify a TBS scaling value.

Example 23 may include the one or more non-transitory computer-readable media of Example 21 or some other example herein, wherein the one or more bits are to indicate physical sidelink control channel (PSCCH) power boosting information, and wherein the one or more bits are to identify a PSCCH power boosting value.

Example 24 may include the one or more non-transitory computer-readable media of Example 21 or 22 or some other example herein, wherein the one or more bits are to indicate modulation and coding scheme (MCS) table selection information, and wherein the MCS table selection information is to identify an MCS table selected.

Example 25 may include a method, comprising: providing a message that includes sidelink control information (SCI) to schedule a physical sidelink shared channel (PSSCH), the SCI to include a bit to indicate rate-matching and transport block size (TBS)-scaling information of the PSSCH; and controlling transmission of the message.

Example 26 may include the method of Example 25 or some other example herein, wherein the SCI is in an SCI Format 1.

Example 27 may include the method of Example 25 or 26 or some other example herein, wherein a value of 1 for the bit is to indicate that the PSSCH is to be transmitted with a transmission format that is to include rate-matching and TBS scaling.

Example 28 may include the method of Example 25 or 26 or some other example herein, wherein a value of 0 for the bit is to indicate that the PSSCH is to be transmitted with a transmission format that is to include puncturing and no TBS scaling.

Example 29 may include the method of Example 25 or 26 or some other example herein, wherein the instructions, when executed by the one or more processors, further cause the apparatus to: cause transmission of the PSSCH.

Example 30 may include the method of Example 25 or 26 or some other example herein, wherein the SCI is further to include a bit to indicate modulation and coding scheme (MCS) table selection information.

Example 31 may include the method of Example 25 or 26 or some other example herein, wherein the SCI is to further to include a bit to indicate transmit diversity information.

Example 32 may include the method of Example 25 or 26 or some other example herein, wherein the SCI is further to include a bit to indicate physical sidelink control channel (PSCCH) power boosting information.

Example 33 may include an apparatus to be implemented in a user equipment (UE), the apparatus comprising: a means for providing a message that includes sidelink control information (SCI) to schedule a physical sidelink shared channel (PSSCH), the SCI to include a bit to indicate rate-matching and transport block size (TBS)-scaling information of the PSSCH; and a means for controlling transmission of the message.

Example 34 may include the apparatus of Example 33 or some other example herein, wherein the SCI is in an SCI Format 1.

Example 35 may include the apparatus of Example 33 or 34 or some other example herein, wherein a value of 1 for the bit is to indicate that the PSSCH is to be transmitted with a transmission format that is to include rate-matching and TBS scaling.

Example 36 may include the apparatus of Example 33 or 34 or some other example herein, wherein a value of 0 for the bit is to indicate that the PSSCH is to be transmitted with a transmission format that is to include puncturing and no TBS scaling.

Example 37 may include the apparatus of Example 33 or 34 or some other example herein, wherein the instructions, when executed by the one or more processors, further cause the apparatus to: cause transmission of the PSSCH.

Example 38 may include the apparatus of Example 33 or 34 or some other example herein, wherein the SCI is further to include a bit to indicate modulation and coding scheme (MCS) table selection information.

Example 39 may include the apparatus of Example 33 or 34 or some other example herein, wherein the SCI is to further to include a bit to indicate transmit diversity information.

Example 40 may include the apparatus of Example 33 or 34 or some other example herein, wherein the SCI is further to include a bit to indicate physical sidelink control channel (PSCCH) power boosting information.

Example 41 may include an apparatus to be implemented in a base station, the apparatus comprising: processing circuitry to: provide a message that includes downlink control information (DCI) to schedule a physical sidelink shared channel (PSSCH), the DCI to include a bit to indicate information of the PSSCH, and control transmission of the message; and memory, coupled with the processing circuitry, to store the DCI.

Example 42 may include the apparatus of Example 41 or some other example herein, wherein the DCI is in a DCI Format 5A.

Example 43 may include the apparatus of Example 41 or 42 or some other example herein, wherein the bit is to indicate rate-matching information of the PSSCH.

Example 44 may include the apparatus of Example 41 or 42 or some other example herein, wherein the bit is to indicate modulation and coding scheme (MCS) table selection information of the PSSCH.

Example 45 may include the apparatus of Example 41 or 42 or some other example herein, wherein the bit is to indicate transmit diversity information of the PSSCH.

Example 46 may include a method, comprising: providing a message that includes downlink control information (DCI) to schedule a physical sidelink shared channel (PSSCH), the DCI to include a bit to indicate information of the PSSCH; and controlling transmission of the message.

Example 47 may include the method of Example 46 or some other example herein, wherein the DCI is in a DCI Format 5A.

Example 48 may include the method of Example 46 or 47 or some other example herein, wherein the bit is to indicate rate-matching information of the PSSCH.

Example 49 may include the method of Example 46 or 47 or some other example herein, wherein the bit is to indicate modulation and coding scheme (MCS) table selection information of the PSSCH.

Example 50 may include the method of Example 46 or 47 or some other example herein, wherein the bit is to indicate transmit diversity information of the PSSCH.

Example 51 may include an apparatus to be implemented in a base station, the apparatus comprising: a means for providing a message that includes downlink control information (DCI) to schedule a physical sidelink shared channel (PSSCH), the DCI to include a bit to indicate information of the PSSCH; and a means for controlling transmission of the message.

Example 52 may include the apparatus of Example 51 or some other example herein, wherein the DCI is in a DCI Format 5A.

Example 53 may include the apparatus of Example 51 or 52 or some other example herein, wherein the bit is to indicate rate-matching information of the PSSCH.

Example 54 may include the apparatus of Example 51 or 52 or some other example herein, wherein the bit is to indicate modulation and coding scheme (MCS) table selection information of the PSSCH.

Example 55 may include the apparatus of Example 51 or 52 or some other example herein, wherein the bit is to indicate transmit diversity information of the PSSCH.

Example 56 may include an apparatus to be implemented in a user equipment (UE), the apparatus comprising: processing circuitry, to: provide a message that includes sidelink control information (SCI) to schedule a physical sidelink shared channel (PSSCH), the SCI to include one or more bits to indicate information of the PSSCH, and control transmission of the message; and memory, coupled with the processing circuitry, to store the SCI.

Example 57 may include the apparatus of Example 56 or some other example herein, wherein the one or more bits are to indicate that the PSSCH is to be transmitted with transport block size (TBS) scaling, and wherein the one or more bits are to identify a TBS scaling value.

Example 58 may include the apparatus of Example 56 or some other example herein, wherein the one or more bits are to indicate physical sidelink control channel (PSCCH) power boosting information, and wherein the one or more bits are to identify a PSCCH power boosting value.

Example 59 may include the apparatus of Example 56 or 57 or some other example herein, wherein the one or more bits are to indicate modulation and coding scheme (MCS) table selection information, and wherein the MCS table selection information is to identify an MCS table selected.

Example 60 may include an apparatus to be implemented in a user equipment (UE), the apparatus comprising: a means for providing a message that includes sidelink control information (SCI) to schedule a physical sidelink shared channel (PSSCH), the SCI to include one or more bits to indicate information of the PSSCH; and a means for controlling transmission of the message.

Example 61 may include the apparatus of Example 60 or some other example herein, wherein the one or more bits are to indicate that the PSSCH is to be transmitted with transport block size (TBS) scaling, and wherein the one or more bits are to identify a TBS scaling value.

Example 62 may include the apparatus of Example 60 or some other example herein, wherein the one or more bits are to indicate physical sidelink control channel (PSCCH) power boosting information, and wherein the one or more bits are to identify a PSCCH power boosting value.

Example 63 may include the apparatus of Example 60 or 61 or some other example herein, wherein the one or more bits are to indicate modulation and coding scheme (MCS) table selection information, and wherein the MCS table selection information is to identify an MCS table selected.

Example 64 may include a method, comprising: providing a message that includes sidelink control information (SCI) to schedule a physical sidelink shared channel (PSSCH), the SCI to include one or more bits to indicate information of the PSSCH, and controlling transmission of the message.

Example 65 may include the method of Example 64 or some other example herein, wherein the one or more bits are to indicate that the PSSCH is to be transmitted with transport block size (TBS) scaling, and wherein the one or more bits are to identify a TBS scaling value.

Example 66 may include the method of Example 64 or some other example herein, wherein the one or more bits are to indicate physical sidelink control channel (PSCCH) power boosting information, and wherein the one or more bits are to identify a PSCCH power boosting value.

Example 67 may include the method of Example 64 or 65 or some other example herein, wherein the one or more bits are to indicate modulation and coding scheme (MCS) table selection information, and wherein the MCS table selection information is to identify an MCS table selected.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

What is claimed is:

1. One or more non-transitory computer-readable media (NTCRM) having instructions that, when executed by one or more processors, cause an apparatus of a user equipment (UE) to:
   generate a sidelink control information (SCI) Format 1 message to schedule a physical sidelink shared channel (PSSCH), the SCI Format 1 message to include a 1-bit transmission format field to include either a first value or a second value,
   the first value indicates that the PSSCH is to be transmitted with a transmission format that is to include rate-matching and transport block size (TBS)-scaling, and
   the second value indicates that the PSSCH is to be transmitted with a transmission format that is to include no TBS scaling and puncturing instead of rate-matching; and
   cause transmission of the SCI Format 1 message.

2. The one or more NTCRM of claim 1, wherein the SCI Format 1 message further includes a 3-bit priority field, a 4-bit resource reservation, a frequency resource location of initial transmission and retransmission, a 4-bit time gap between initial transmission and retransmission field, and a 5-bit modulation and coding scheme field.

3. The one or more NTCRM of claim 1, wherein the first value is 1.

4. The one or more NTCRM of claim 1, wherein the second value is 0.

5. The one or more NTCRM of claim 1, wherein the instructions, when executed by the one or more processors, further cause the apparatus to: cause transmission of the PSSCH.

6. A System-on-Chip (SoC) to be implemented in a user equipment (UE), the SoC comprising:
baseband circuitry arranged to generate a sidelink control information (SCI) Format 1 message to schedule a physical sidelink shared channel (PSSCH), the SCI format 1 message to include a 1-bit transmission format field to include either a first value or a second value, the first value indicates that the PSSCH is to be transmitted with a transmission format that is to include rate-matching and transport block size (TBS)-scaling, and the second value indicates that the PSSCH is to be transmitted with a transmission format that is to include no TBS scaling and puncturing instead of rate-matching; and
interface circuitry coupled with the baseband circuitry, the interface circuitry configured to communicatively couple the SoC with radiofrequency (RF) circuitry implemented in the UE, the interface circuitry arranged to provide the SCI Format 1 message to the RF circuitry for transmission of the SCI Format 1 message.

7. The SoC of claim 6, wherein the SCI Format 1 message further includes a 3-bit priority field, a 4-bit resource reservation, a frequency resource location of initial transmission and retransmission, a 4-bit time gap between initial transmission and retransmission field, and a 5-bit modulation and coding scheme field.

8. The SoC of claim 6, wherein the first value is 1.

9. The SoC of claim 6, wherein the second value is 0.

10. The SoC of claim 6, wherein the interface circuitry is further arranged to provide the PSSCH to the RF circuitry for transmission.

11. An apparatus to be implemented in a user equipment (UE), comprising:
processor circuitry, to:
generate a sidelink control information (SCI) Format 1 to schedule a physical sidelink shared channel (PSSCH), the SCI Format 1 to include a 1-bit transmission format field to include either a first value or a second value, the first value indicates that the PSSCH is to be transmitted with a transmission format that is to include rate-matching and transport block size (TBS)-scaling, and the second value indicates that the PSSCH is to be transmitted with a transmission format that is to include no TBS scaling and puncturing instead of rate-matching, and
cause transmission of the SCI Format 1; and
memory circuitry communicatively coupled with the processor circuitry, the memory circuitry arranged to store the SCI Format 1.

12. The apparatus of claim 11, wherein the SCI Format 1 further includes a 3-bit priority field, a 4-bit resource reservation, a frequency resource location of initial transmission and retransmission, a 4-bit time gap between initial transmission and retransmission field, and a 5-bit modulation and coding scheme field.

13. The apparatus of claim 11, wherein the first value is 1.

14. The apparatus of claim 11, wherein the second value is 0.

15. The apparatus of claim 11, wherein the processor circuitry is further arranged to:
cause transmission of the PSSCH.

16. A System-on-Chip (SoC) to be implemented in a user equipment (UE), the SoC comprising:
interface circuitry configured to communicatively couple the SoC with radiofrequency (RF) circuitry implemented in the UE, the interface circuitry arranged to obtain, from the RF circuitry, a sidelink control information (SCI) Format 1 message to schedule a physical sidelink shared channel (PSSCH), the SCI Format 1 message including a 1-bit transmission format field; and
baseband circuitry coupled with the interface circuitry, the baseband circuitry arranged to:
perform rate-matching and transport block size (TBS)-scaling for receipt of the PSSCH when the transmission format field includes a first value, and
perform no TBS scaling and puncturing instead of rate-matching for receipt of the PSSCH when the transmission format field includes a second value.

17. The SoC of claim 16, wherein the SCI Format 1 further includes a 3-bit priority field, a 4-bit resource reservation, a frequency resource location of initial transmission and retransmission, a 4-bit time gap between initial transmission and retransmission field, and a 5-bit modulation and coding scheme field.

18. The SoC of claim 16, wherein the first value indicates that the PSSCH is to be transmitted with a transmission format that is to include TBS-scaling for receipt of the PSSCH, and the second value indicates that the PSSCH is to be transmitted with a transmission format that is to include puncturing and no TBS scaling.

19. The SoC of claim 18, wherein the first value is 1 and the second value is 0.

20. The SoC of claim 16, wherein the interface circuitry is arranged to obtain the PSSCH from the RF circuitry.

* * * * *